(12) United States Patent
Zakharchenko et al.

(10) Patent No.: US 12,184,898 B2
(45) Date of Patent: Dec. 31, 2024

(54) VIDEO-BASED POINT CLOUD COMPRESSION (V-PCC) TIMING INFORMATION

(71) Applicant: Huawei Technologies Co., Ltd., Guangdong Province (CN)

(72) Inventors: Vladyslav Zakharchenko, Sunnyvale, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 17/714,608

(22) Filed: Apr. 6, 2022

(65) Prior Publication Data

US 2022/0232261 A1 Jul. 21, 2022

Related U.S. Application Data

(63) Continuation of application No. PCT/US2020/054417, filed on Oct. 6, 2020.
(Continued)

(51) Int. Cl.
*H04N 19/00* (2014.01)
*H04N 19/136* (2014.01)
(Continued)

(52) U.S. Cl.
CPC ........... *H04N 19/70* (2014.11); *H04N 19/136* (2014.11); *H04N 19/597* (2014.11)

(58) Field of Classification Search
CPC ..... H04N 19/70; H04N 19/136; H04N 19/597
See application file for complete search history.

(56) References Cited

U.S. PATENT DOCUMENTS

| 2013/0287115 A1* | 10/2013 | Wang | H04N 19/70 375/240.18 |
| 2014/0192903 A1* | 7/2014 | Wang | H04N 19/85 375/240.28 |

(Continued)

FOREIGN PATENT DOCUMENTS

| EP | 2941885 B1 | 2/2016 |
| WO | 2014107360 A1 | 7/2014 |

OTHER PUBLICATIONS

Nokia "[PCC] On high level syntax of V-PCC", International Organisation for Standardisation Organisation Internationale De Normalisation ISO/IEC JTC1/SC29/WG11 Coding of Moving Pictures and Audio ISO/IEC JTCI/SC29/WGI I MPEG2018/m44727, Oct. 2018, Macau, Macau, 5 pages.

(Continued)

*Primary Examiner* — Zhihan Zhou
(74) *Attorney, Agent, or Firm* — Conley Rose, P.C

(57) ABSTRACT

A method implemented by a PCC decoder and comprising: receiving, by the PCC decoder, a point cloud bitstream comprising timing_info_present_flag, wherein the timing_info_present_flag specifies whether num_units_in_tick, time_scale, and poc_proportional_to_timing_flag are or are not present in a syntax structure; and decoding, by the PCC decoder using the timing_info_present_flag, the point cloud bitstream to obtain a decoded point cloud bitstream. A method implemented by a PCC decoder and comprising: receiving, by the PCC decoder, a point cloud bitstream comprising num_units_in_tick, wherein num_units_in_tick is a number of time units of a clock operating at a frequency time_scale hertz (Hz) that corresponds to one increment of a clock tick counter; and decoding, by the PCC decoder using the num_units_in_tick, the point cloud bitstream to obtain a decoded point cloud bitstream.

18 Claims, 20 Drawing Sheets

Related U.S. Application Data

(60) Provisional application No. 62/911,815, filed on Oct. 7, 2019.

(51) Int. Cl.
*H04N 19/597* (2014.01)
*H04N 19/70* (2014.01)

(56) References Cited

U.S. PATENT DOCUMENTS

| | | | | |
|---|---|---|---|---|
| 2014/0307803 | A1* | 10/2014 | Wang | H04N 19/70 375/240.25 |
| 2017/0180744 | A1* | 6/2017 | Deshpande | H04N 19/187 |
| 2017/0324981 | A1* | 11/2017 | Deshpande | H04N 19/597 |
| 2018/0302647 | A1* | 10/2018 | Tanaka | H04N 13/243 |
| 2019/0139266 | A1* | 5/2019 | Budagavi | G06T 9/00 |

OTHER PUBLICATIONS

Information technology—Coded Representation of Immersive Media—Part 5: Video-based Point Cloud Compression, ISO/IEC 2018, ISO/IEC 23090-5:2018(E) ISO/IEC JTC 1/SC 29/WG 11 Secretariat: JISC, 2018, 166 pages.

Series H: Audiovisual and Multimedia Systems Infrastructure of audiovisual services—Coding of moving video; High efficiency video coding, Recommendation ITU-T H.265, Dec. 2016, 664 pages.

Sony Corporation of America, et al., "[V-PCC] Requirements for conformance point B", International Organisation for Standardisation Organisation Internationale De Normalisation ISO/IEC JTC1/SC29/WG11 Coding of Moving Pictures and Audio ISO/IEC JTC1/SC29/WG11 MPEG2019/m51146 Oct. 2019, Geneva, CH, 15 pages.

"Series H: Audiovisual and Multimedia Systems; Infrastructure of audiovisual services—Coding of moving video; High efficiency video coding" Recommendation ITU-T H.265, Apr. 2013, 317 pages.

"Information technology—Coded Representation of Immersive Media—Part 5: Visual Volumetric Video-based Coding (V3C) and Video-based Point Cloud Compression (V-PCC)," ISO/IEC/ JTC 1/SC 29/WG 11, Sep. 2, 2020, 334 pages.

\* cited by examiner

VIDEO-BASED POINT CLOUD COMPRESSION (V-PCC) TIMING INFORMATION

CROSS-REFERENCE TO RELATED APPLICATIONS

This is a continuation of Int'l Patent App. No. PCT/US2020/054417 filed on Oct. 6, 2020, which claims priority to U.S. Prov. Patent App. No. 62/911,815 filed on Oct. 7, 2019, both of which are incorporated by reference.

TECHNICAL FIELD

The disclosed embodiments relate to PCC in general and V-PCC timing information in particular.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method implemented by a PCC decoder and comprising: receiving, by the PCC decoder, a point cloud bitstream comprising timing_info_present_flag, wherein the timing_info_present_flag specifies whether num_units_in_tick, time_scale, and poc_proportional_to_timing_flag are or are not present in a syntax structure; and decoding, by the PCC decoder using the timing_info_present_flag, the point cloud bitstream to obtain a decoded point cloud bitstream.

The embodiments provide timing_info_present_flag, num_units_in_tick, time_scale, poc_proportional_to_timing_flag, and num_ticks_poc_diff_one_minus1 as syntax elements in the bitstream. Those syntax elements provide timing information, and thus a more accurate reconstruction process.

Optionally, in any of the preceding aspects, the timing_info_present_flag equal to 1 specifies that the num_units_in_tick, the time_scale, and the poc_proportional_to_timing_flag are present in the syntax structure.

Optionally, in any of the preceding aspects, the timing_info_present_flag equal to 0 specifies that the num_units_in_tick, the time_scale, and the poc_proportional_to_timing_flag are not present in the syntax structure.

A second aspect relates to a method implemented by a PCC encoder and comprising: generating timing_info_present_flag, wherein the timing_info_present_flag specifies whether num_units_in_tick, time_scale, and poc_proportional_to_timing_flag are or are not present in a syntax structure; encoding, by the PCC encoder, the timing_info_present_flag into a point cloud bitstream; and storing, by the PCC encoder, the point cloud bitstream for communication toward a PCC decoder.

A third aspect relates to a method implemented by a PCC decoder and comprising: receiving, by the PCC decoder, a point cloud bitstream comprising num_units_in_tick, wherein num_units_in_tick is a number of time units of a clock operating at a frequency time_scale Hz that corresponds to one increment of a clock tick counter; and decoding, by the PCC decoder using the num_units_in_tick, the point cloud bitstream to obtain a decoded point cloud bitstream.

Optionally, in any of the preceding aspects, the one increment is called a clock tick.

Optionally, in any of the preceding aspects, the num_units_in_tick shall be greater than 0.

Optionally, in any of the preceding aspects, a clock tick, in units of seconds, is equal to a quotient of the num_units_in_tick divided by the time_scale.

A fourth aspect relates to a method implemented by a PCC encoder and comprising: generating num_units_in_tick, wherein the num_units_in_tick is a number of time units of a clock operating at a frequency time_scale Hz that corresponds to one increment of a clock tick counter; encoding, by the PCC encoder, the num_units_in_tick into a point cloud bitstream; and storing, by the PCC encoder, the point cloud bitstream for communication toward a PCC decoder.

A fifth aspect relates to a method implemented by a PCC decoder and comprising: receiving, by the PCC decoder, a point cloud bitstream comprising time_scale, wherein the time_scale is a number of time units that pass in one second; and decoding, by the PCC decoder using the time_scale, the point cloud bitstream to obtain a decoded point cloud bitstream.

A sixth aspect relates to a method implemented by a PCC encoder and comprising: generating time_scale, wherein the time_scale is a number of time units that pass in one second; encoding, by the PCC encoder, the time_scale into a point cloud bitstream; and storing, by the PCC encoder, the point cloud bitstream for communication toward a PCC decoder.

A seventh aspect relates to a method implemented by a PCC decoder and comprising: receiving, by the PCC decoder, a point cloud bitstream comprising poc_proportional_to_timing_flag, wherein the poc_proportional_to_timing_flag equal to a first value indicates that an order count value for each component in a CS that is not a first component in the CS, in decoding order, is proportional to an output time of the component relative to an output time of the first component in the CS, and wherein the poc_proportional_to_timing_flag equal to a second value indicates that the order count value for each component in the CS that is not the first component in the CS, in the decoding order, may or may not be proportional to the output time of the component relative to the output time of the first component in the CS; and decoding, by the PCC decoder using the poc_proportional_to_timing_flag, the point cloud bitstream to obtain a decoded point cloud bitstream.

Optionally, in any of the preceding aspects, the first value is 1.

Optionally, in any of the preceding aspects, the first value is 0.

An eighth aspect relates to a method implemented by a PCC encoder and comprising: generating poc_proportional_to_timing_flag, wherein the poc_proportional_to_timing_flag equal to a first value indicates that an order count value for each component in a CS that is not a first component in the CS, in decoding order, is proportional to an output time of the component relative to an output time of the first component in the CS, and wherein the poc_proportional_to_timing_flag equal to a second value indicates that the order count value for each component in the CS that is not the first component in the CS, in the decoding order, may or may not be proportional to the output time of the component relative to the output time of the first component in the CS; encoding, by the PCC encoder, the poc_proportional_to_timing_flag into a point cloud bitstream; and storing, by the PCC encoder, the point cloud bitstream for communication toward a PCC decoder.

A ninth aspect relates to a method implemented by a PCC decoder and comprising: receiving, by the PCC decoder, a point cloud bitstream comprising num_ticks_poc_diff_one_minus1, wherein the num_ticks_poc_diff_one_minus1 plus 1 specifies a number of clock ticks corresponding to a difference of order count values equal to 1; and decoding, by the PCC decoder using the num_ticks_poc_diff_one_minus1, the point cloud bitstream to obtain a decoded point cloud bitstream.

Optionally, in any of the preceding aspects, a value of the num_ticks_poc_diff_one_minus1 shall be in the range of 0 to $2^{32}-2$, inclusive.

A tenth aspect relates to a method implemented by a PCC encoder and comprising: generating num_ticks_poc_diff_one_minus1, wherein the num_ticks_poc_diff_one_minus1 plus 1 specifies a number of clock ticks corresponding to a difference of order count values equal to 1; encoding, by the PCC encoder, the num_ticks_poc_diff_one_minus1 into a point cloud bitstream; and storing, by the PCC encoder, the point cloud bitstream for communication toward a PCC decoder.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
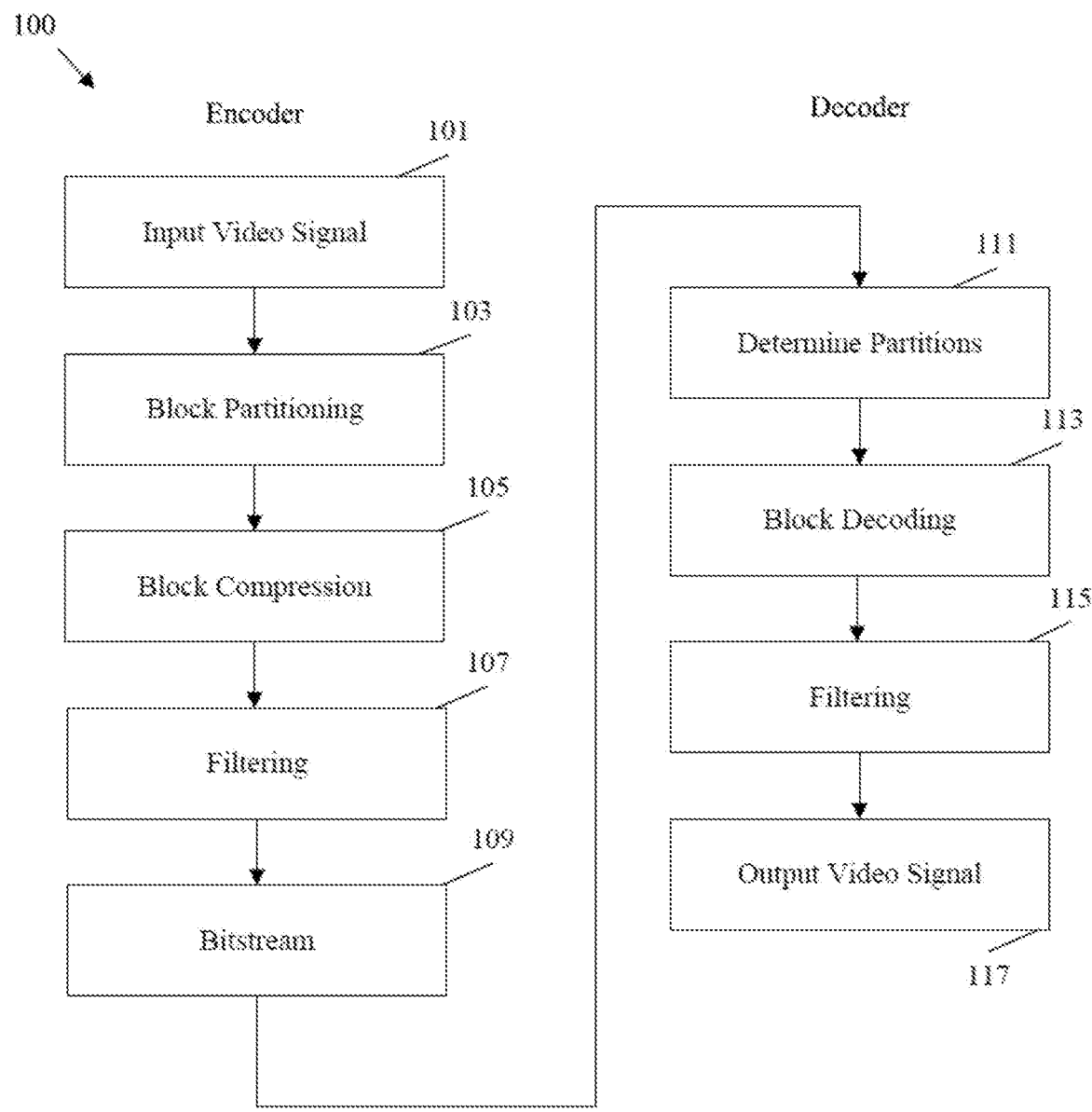
FIG. 1 is a flowchart of an example method of coding a video signal.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ASIC: application-specific integrated circuit
ASPS: atlas sequence parameter set
AU: access unit
BT: binary tree
CAB: coded atlas buffer
CABAC: context-adaptive binary arithmetic coding
CAS: coded atlas sequence
CAVLC: context-adaptive variable-length coding
Cb: blue difference chroma
CB: coding block
CP A: conformance point A
CP B: conformance point B
CPS: coded picture sequence
CPU: central processing unit
Cr: red difference chroma
CS: coded sequence
CTB: coding tree block
CTU: coding tree unit
CU: coding unit
CVS: coded VPC sequence
DAB: decoded atlas buffer
DC: direct current
DCT: discrete cosine transform DMM: depth modeling mode
DPB: decoded picture buffer
DSP: digital signal processor
DST: discrete sine transform
EO: electrical-to-optical
FIFO: first-in, first-out
FPGA: field-programmable gate array
HEVC: High Efficiency Video Coding
HRD: hypothetical reference decoder
HSS: hypothetical stream scheduler
Hz: hertz
ID: identifier
IEC: International Electrotechnical Commission
info: information
I/O: input/output
ISO: International Organization for Standardization
ITU: International Telecommunication Union
ITU-T: ITU Telecommunication Standardization Sector
MHz: megahertz
NAL: network abstraction layer
OE: optical-to-electrical
PCC: point cloud compression
PIPE: probability interval partitioning entropy
PU: prediction unit
PUI: point cloud usability information
QT: quad tree
RAM: random-access memory
RBS: raw byte sequence
RBSP: RBS payload
RDO: rate-distortion optimization
RGB: red, green, and blue
ROM: read-only memory
SAD: sum of absolute differences
SAO: sample adaptive offset
SBAC: syntax-based arithmetic coding
SEI: supplemental enhancement information
SPS: sequence parameter set
SRAM: static random-access memory
SSD: sum of squared differences
TCAM: ternary content-addressable memory
TT: triple tree
TU: transform unit
TX/RX: transceiver unit
V-PCC: video-based PCC
VPS: V3C parameter set
VUI: volumetric usability information
V3C: visual volumetric video-based coding
2D: two-dimensional
3D: three-dimensional.

The following terms are defined as follows unless otherwise specified. Terms may be described differently in different contexts. Accordingly, the following definitions should be considered as a supplement and should not be considered to limit any other definitions of descriptions provided.

An encoder is a device that is configured to employ encoding processes to compress point cloud data into a bitstream. A decoder is a device that is configured to employ decoding processes to reconstruct point cloud data from a bitstream for display. A point cloud/point cloud representation is a group of points (e.g., samples) in 3D space, where each point may contain a position and optionally an attribute such as color. A bitstream is a sequence of bits, including pint cloud data, that is compressed for transmission between an encoder and a decoder. In a PCC context, a bitstream includes a sequence of bits of coded V-PCC components.

A V-PCC component, or more generally a PCC component, may be atlas data, occupancy map data, geometry data, or attribute data of a particular type that is associated with a V-PCC point cloud. An atlas may be a collection of 2D bounding boxes, or patches, projected into rectangular frames that correspond to a 3D bounding box in 3D space, where each 2D bounding box represents a subset of a point cloud. An occupancy map may be a 2D array corresponding to an atlas whose values indicate, for each sample position in the atlas, whether that position corresponds to a valid 3D point in the point cloud representation. A geometry map may be a 2D array created through the aggregation of the geometry information associated with each patch, where geometry information may be a set of Cartesian coordinates associated with a point cloud frame. An attribute may be a scalar or vector property optionally associated with each point in a point cloud and may refer to color, reflectance, surface normal, time stamps, or a material ID. A complete set of atlas data, occupancy maps, geometry maps, or attributes associated with a particular time instance may be referred to as an atlas frame, an occupancy map frame, a geometry frame, and an attribute frame, respectively. Atlas data, occupancy map data, geometry data, or attribute data may be components of a point cloud, and hence may be referred to as atlas components, occupancy map components, geometry components, and attribute frame components, respectively.

An AU may be a set of NAL units that are associated with each other according to a specified classification rule and pertain to one particular output time. A coded component may be data that has been compressed for inclusion in a bitstream. A decompressed component may be data from a bitstream or sub-bitstream that has been reconstructed as part of a decoding process or as part of an HRD conformance test. A HRD may be a decoder model operating on an encoder that checks the variability of bitstreams produced by an encoding process to verify conformance with specified constraints. An HRD conformance test may determine whether an encoded bitstream complies with a standard. A conformance point may be a point in a decoding/reconstruction process where an HRD performs an HRD conformance check to verify that decompressed or reconstructed data comply with a standard. HRD parameters may be syntax elements that initialize or define operational conditions of an HRD. An SEI message may be a syntax structure with specified semantics that conveys information that is not needed by decoding processes in order to determine the values of samples in decoded pictures. A buffering period SEI message may be an SEI message that contains data indicating initial removal delays related to a CAB in an HRD. An atlas frame timing SEI message may contain data indicating a removal delay relating to a CAB and an output delay related to a DAB in a HRD. A reconstructed point cloud may be a point cloud that is generated based on data from the PCC bitstream. A reconstructed point cloud should approximate the point cloud that is coded into the PCC bitstream.

A decoding unit may be any coded component from a bitstream or sub-bitstream that is stored in a buffer for decoding. A CAB removal delay may be an amount of time a component can remain in the CAB prior to removal. An initial CAB removal delay may be an amount of time a component in a first AU in a bitstream or sub-bitstream can remain in the CAB prior to removal. A DAB may be a FIFO buffer in an HRD that contains decoded atlas frames in decoding order for use during PCC bitstream conformance testing. A DAB output delay may be an amount of time a decoded component can remain in the DAB prior to being output (e.g., as part of a reconstructed point cloud).

V-PCC is a mechanism for efficiently coding 3D objects represented by a cloud of points of varying attributes. Specifically, V-PCC is employed to encode or decode such point clouds for display as part of a video sequence. The point cloud is captured over time and included in PCC frames. The PCC frames are split into PCC components, which are then encoded. The position of each valid point in the cloud at a time instance is stored as a geometry map in a geometry frame. The colors are stored as an attribute frame. Specifically, the patches at an instant in time are packed into an atlas frame. The patches generally do not cover the entire atlas frame. Accordingly, occupancy frames are also generated and indicate which portions of atlas frames contain valid patch data. Optionally, attributes of the points, such as transparency, opacity, and/or other data, may be included in an attribute frame. As such, each PCC frame can be encoded as a plurality of frames containing different components describing the point cloud at a corresponding instant. Further, different components may be coded by employing different coding and decoding systems.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain luma components, or luma samples, which are pixels expressed in terms of light, and contain chroma components, or chroma samples, which are pixels expressed in terms of color. In some examples, the frames may also contain depth values to support 3D viewing.

At step 103, the video is partitioned into blocks. Partitioning includes subdividing the pixels in each frame into square or rectangular blocks for compression. For example, in HEVC, the frame can first be divided into CTUs, which are blocks of a predefined size (e.g., 64×64 pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction or intra-prediction may be employed. Inter-prediction takes advantage of the fact that objects in a common scene tend to appear in successive frames. Accordingly, a block depicting an object in a reference frame need not be repeatedly described in adjacent frames. Specifically, an object such as a table may remain in a constant position over multiple frames. Hence the table is described once, and adjacent frames can refer back to the reference frame. Pattern matching mechanisms may be employed to match objects over multiple frames. Further, moving objects may be represented across multiple frames, for example, due to object movement or camera movement. As a particular example, a video may show an automobile that moves across the screen over multiple frames. Motion vectors can be employed to describe such movement. A motion vector is a 2D vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., 33 in HEVC), a planar mode, and a DC mode. The directional modes indicate that a current block is similar to or the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar to or the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block-based prediction discussed above may result in the creation of blocky images at the decoder. Further, the block-based prediction scheme may encode a block and then reconstruct the encoded block for later use as a reference block. The in-loop filtering scheme iteratively applies noise suppression filters, de-blocking filters, adaptive loop filters, and SAO filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above, as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast or multicast toward a plurality of decoders. The creation of the bitstream is an iterative process. Accordingly, steps 101, 103, 105, 107, and 109 may occur continuously or simultaneously over many frames and blocks. The steps shown in FIG. 1 may be in another suitable order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input images. Signaling the exact choices may employ a large number of bins. A bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code word is based on the number of allowable options (i.e., one bin for two options, two bins for three to four options, etc.) The encoder then encodes the code word for the selected option. This scheme reduces the size of the code words as the code words are as big as desired to uniquely indicate a selection from a small subset of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
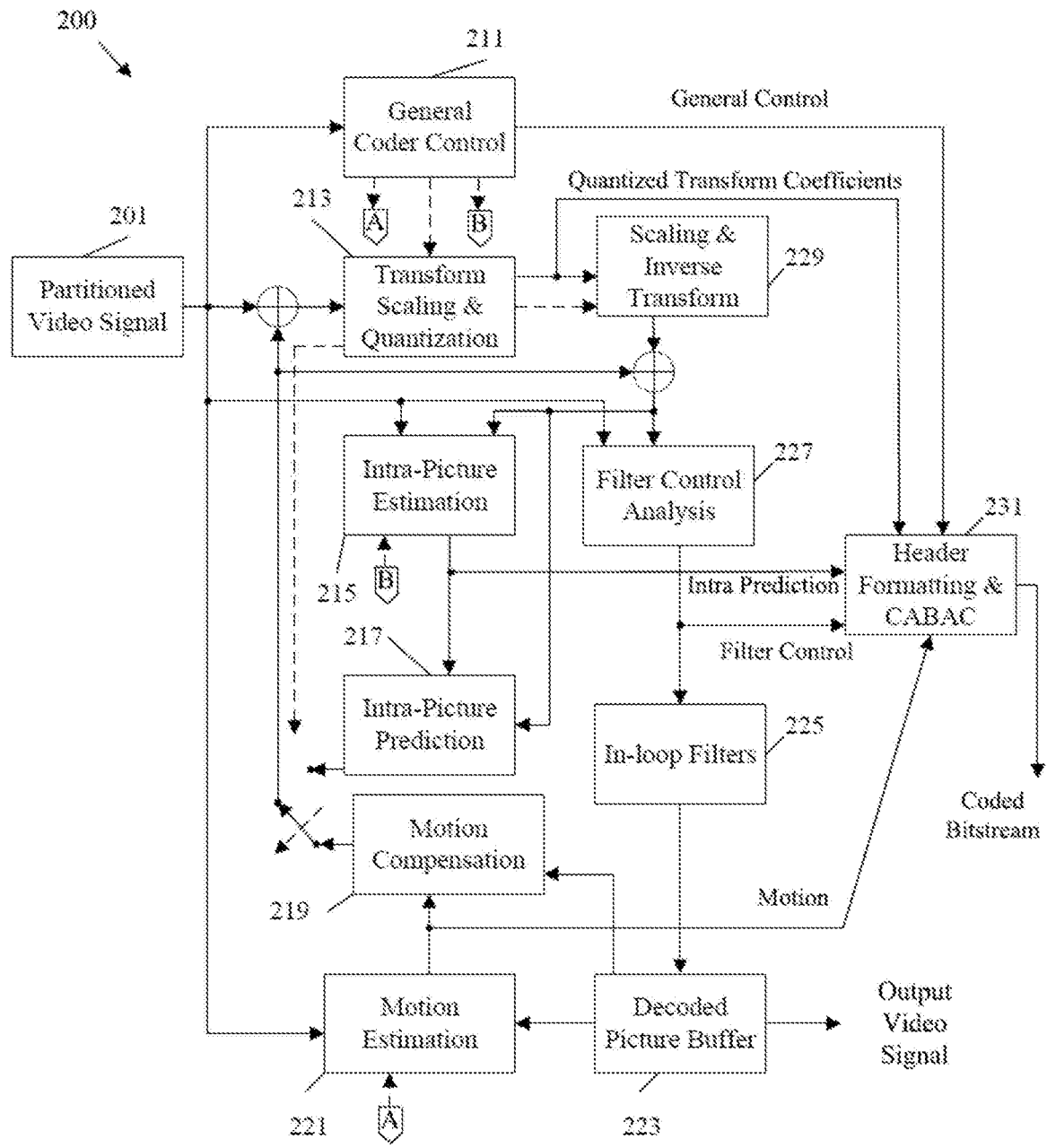
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and CABAC component 231. Black lines indicate movement of data to be coded, and dashed lines indicate movement of control data that control the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in CUs. For example, a CU can be a sub-portion of a CTU that contains a luma block, Cr blocks, and Cb block, along with corresponding syntax instructions for the CU. The split modes may include a BT, TT, and QT employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by SAD, SSD, or other difference metrics. HEVC employs several coded objects including a CTU, CTBs, and CUs. For example, a CTU can be divided into CTBs, which can then be divided into CBs for inclusion in CUs. A CU can be encoded as a PU containing prediction data or a TU containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a DMM based on RDO.

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a DCT, a DST, or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing CAVLC, CABAC, SBAC, PIPE coding, or another entropy coding technique. Following the entropy coding, the coded bitstream may be transmitted to another device (e.g., a video decoder) or archived for later transmission or retrieval.

Figure 3:
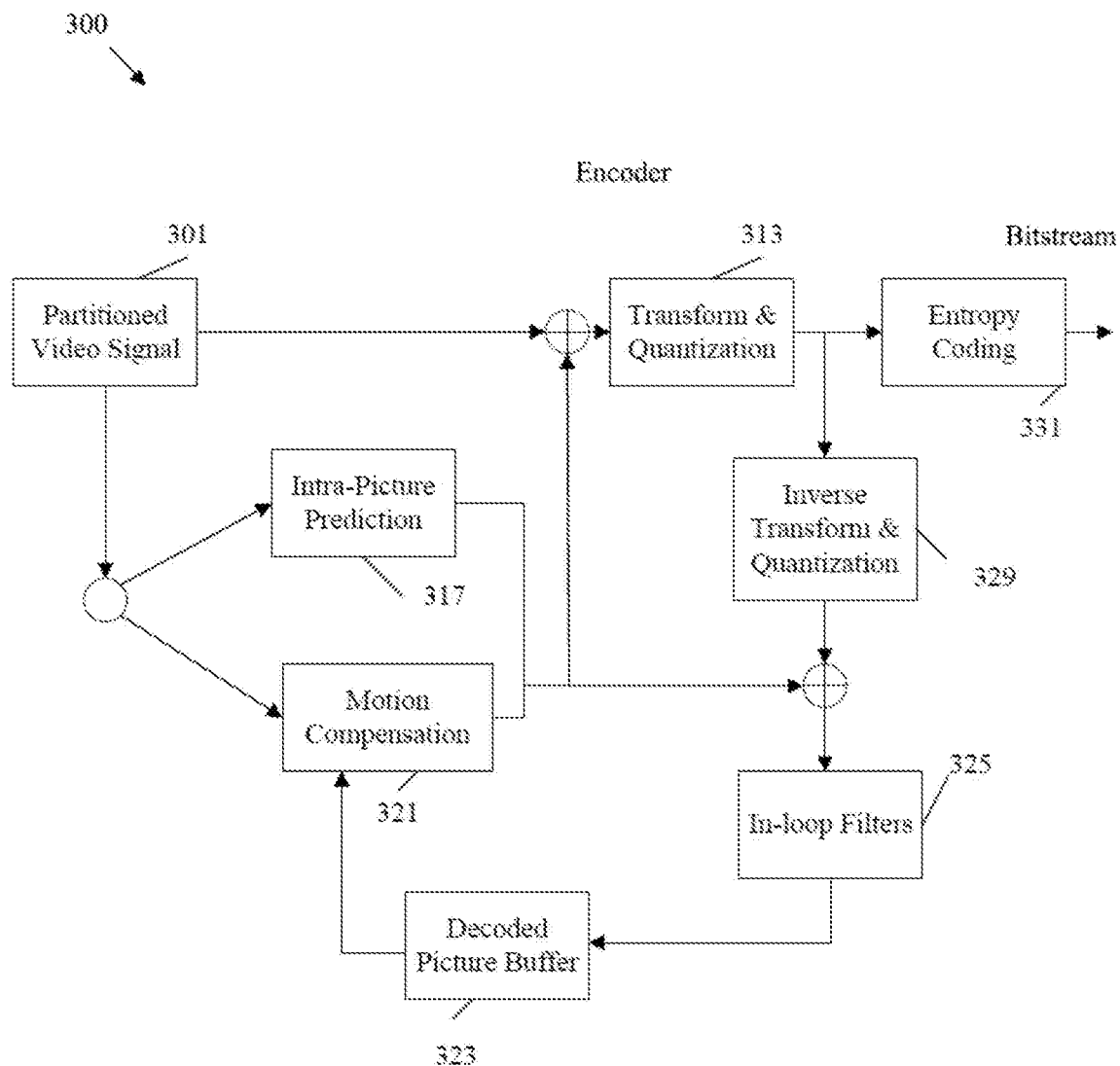
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
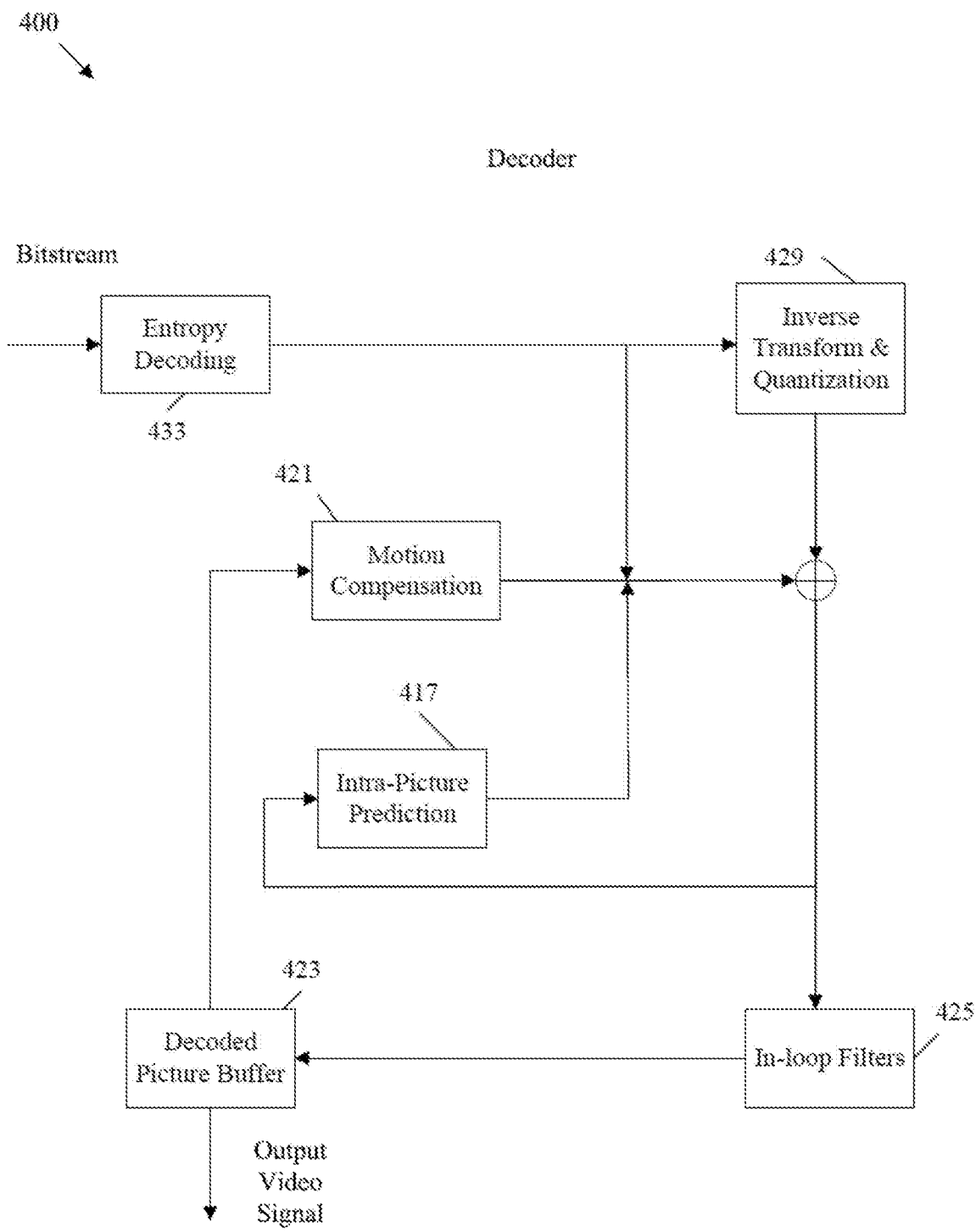
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
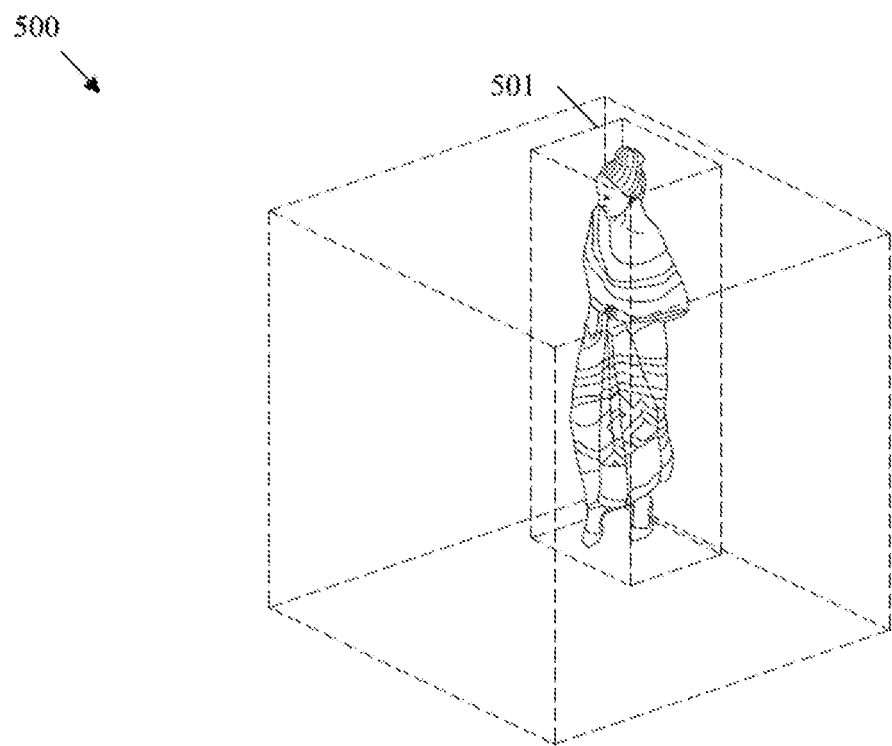
FIG. 5 is an example of point cloud media that can be coded according to PCC mechanisms.

FIG. 5 is an example of point cloud media 500 that can be coded according to PCC mechanisms. Accordingly, point cloud media 500 may be coded by an encoder, such as codec system 200 and/or encoder 300, and reconstructed by a decoder, such as codec system 200 and/or decoder 400, when performing method 100.

The mechanisms described in FIGS. 1-4 generally presume a 2D frame is being coded. However, point cloud media 500 is a cloud of points that change over time. Specifically, the point cloud media 500, which can also be referred to as a point cloud and/or a point cloud representation, is group of points in 3D space. The points may also be referred to as samples. Each point may be associated with multiple types of data. For example, each point may be described in terms of position. Position is a location in 3D space that may be described as a set of Cartesian coordinates. Further, each point may contain a color. Color may be described in terms of luminance (e.g., light) and chrominance (e.g., color). Color may be described in terms of (R), green (G), and blue (B) values, or luma (Y), blue projection (U), and red projection (V), denoted as (R, G, B) or (Y, U, V), respectively. The points may also include other attributes. An attribute is an optional scalar or a vector property that may be associated with each point in a point cloud. Attributes may include reflectance, transparency, surface normal, time stamps, and material ID.

As each point in a point cloud media 500 may be associated with multiple types of data, several supporting mechanisms are employed to prepare the point cloud media 500 for compression according to the mechanisms described in FIGS. 1-4. For example, the point cloud media 500 can be sorted into frames, where each frame includes all the data related to a point cloud for a particular state or instant in time. As such, FIG. 5 depicts a single frame of the point cloud media 500. The point cloud media 500 is then coded on a frame by frame basis. The point cloud media 500 can be surrounded by a 3D bounding box 501. The 3D bounding box 501 is a 3D rectangular prism that is sized to surround all of the points of the point cloud media 500 for the corresponding frame. It should be noted that multiple 3D bounding boxes 501 may be employed in the event that the point cloud media 500 includes disjoint sets. For example, the point cloud media 500 could depict two figures that are not connected, in which case a 3D bounding box 501 would be placed around each figure. The points in the 3D bounding box 501 are processed as described below.

Figure 6:
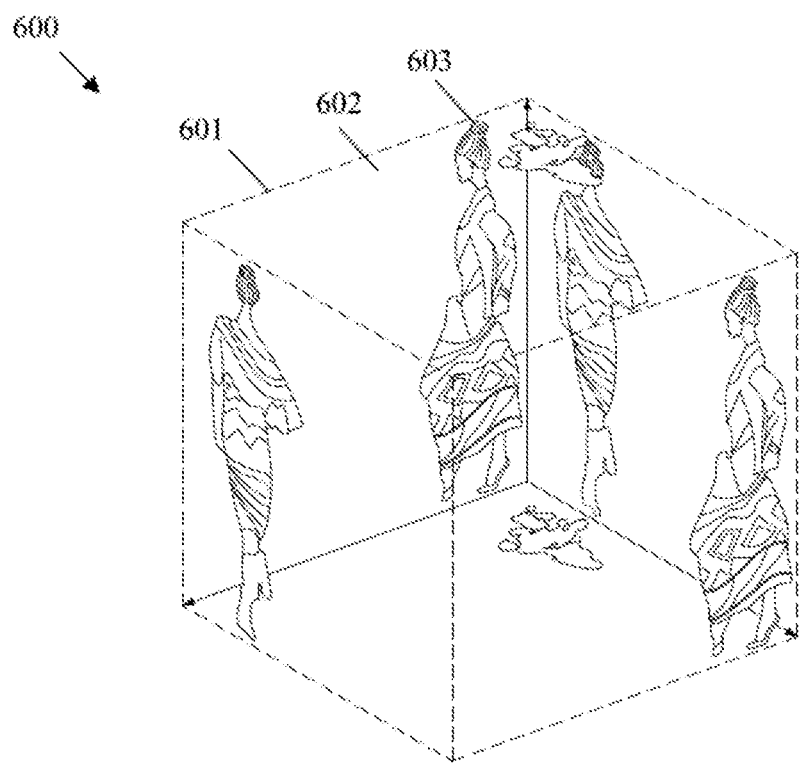
FIG. 6 is an example of patches created from a point cloud.

FIG. 6 is an example of patches 603 created from a point cloud 600. Point cloud 600 is a single frame of point cloud media 500. Further, point cloud 600 is surrounded by a 3D bounding box 601 that is substantially similar to 3D bounding box 501. Accordingly, point cloud 600 may be coded by an encoder, such as codec system 200 and/or encoder 300, and reconstructed by a decoder, such as codec system 200 and/or decoder 400, when performing method 100.

The 3D bounding box 601 includes six faces, and hence includes six 2D rectangular frames 602 that are each positioned at a face of the 3D bounding box 601 (e.g., top, bottom, left, right, front, and back). The point cloud 600 can be converted from 3D data into 2D data by projecting the point cloud 600 onto the corresponding 2D rectangular frames 602. This results in the creation of patches 603. A patch 603 is a 2D representation of a 3D point cloud, where the patch 603 contains a representation of the point cloud 600 that is visible from the corresponding 2D rectangular frame 602. It should be noted that a representation of the point cloud 600 from a 2D rectangular frame 602 may contain multiple disjoint components. As such, a 2D rectangular frame 602 may contain a plurality of patches 603. As such, a point cloud 600 may be represented by more than six patches 603. The patches 603 may also be referred to as atlas, atlas data, atlas information, and/or atlas components. By converting the 3D data into a 2D format, the point cloud 600 can be coded according to video coding mechanisms, such as inter-prediction and/or intra-prediction.

Figure 7A:
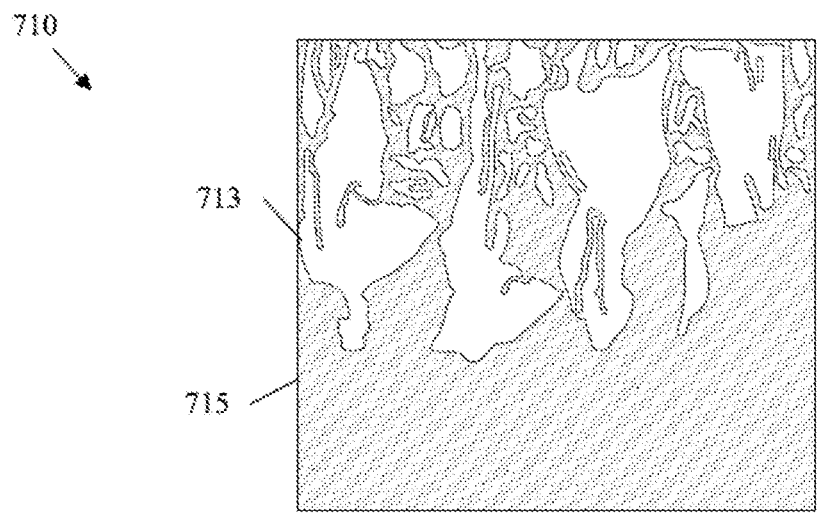
FIG. 7A illustrates an example occupancy frame associated with a set of patches.
Figure 7B:
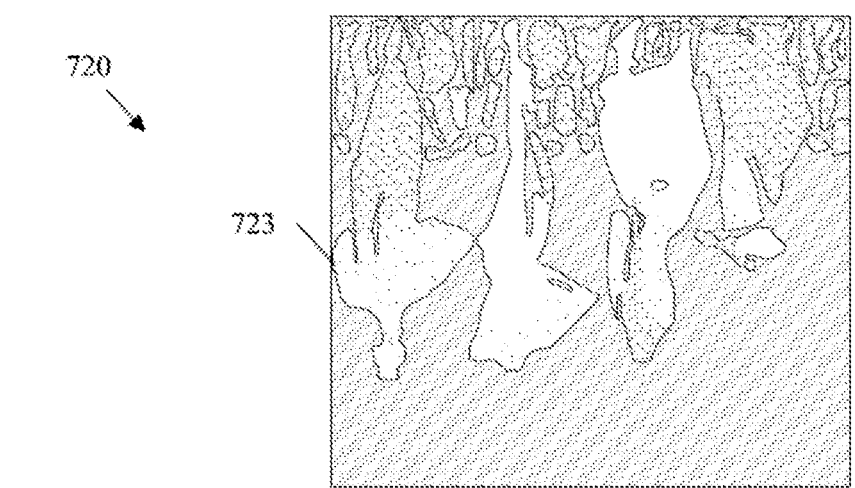
FIG. 7B illustrates an example geometry frame associated with a set of patches.
Figure 7C:
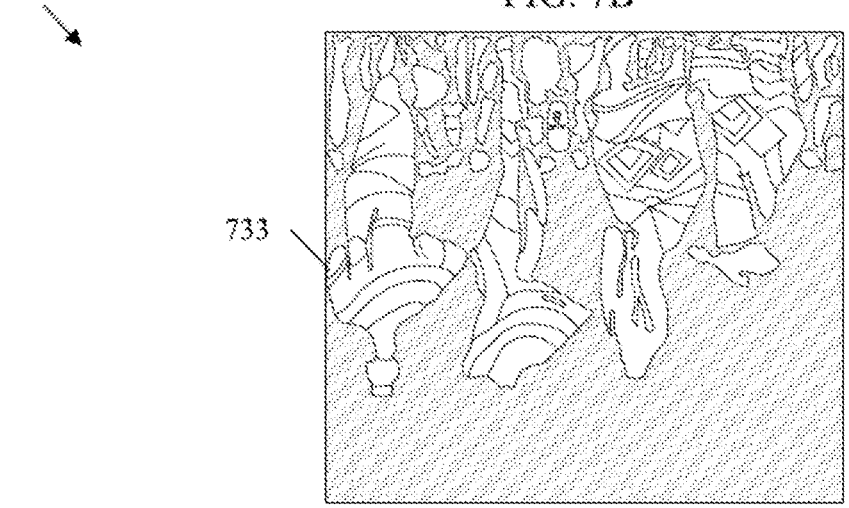
FIG. 7C illustrates an example atlas frame associated with a set of patches.

FIGS. 7A-7C illustrate mechanisms for encoding a 3D point cloud that has been converted into 2D information as described in FIG. 6. Specifically, FIG. 7A illustrates an example occupancy frame 710 associated with a set of patches, such as patches 603. The occupancy frame 710 is coded in binary form. For example, a zero represents that a portion of the bounding box 601 is not occupied by one of the patches 603. Those portions of the bounding box 601 represented by the zeros do not take part in reconstruction of a volumetric representation (e.g., the point cloud 600). In contrast, a one represents that a portion of the bounding box 601 is occupied by one of the patches 603. Those portions of the bounding box 601 represented by the ones do take part in reconstruction of the volumetric representation (e.g., the point cloud 600). Further, FIG. 7B illustrates an example geometry frame 720 associated with a set of patches, such as patches 603. The geometry frame 720 provides or depicts the contour or topography of each of the patches 603. Specifically, the geometry frame 720 indicates the distance that each point in the patches 603 is away from the planar surface (e.g., the 2D rectangular frame 602) of the bounding box 601. Also, FIG. 7C illustrates an example atlas frame 730 associated with a set of patches, such as patches 603. The atlas frame 730 provides or depicts samples of the patches 603 in the bounding box 601. The atlas frame 730 may include, for example, a color component of the points in the patches 603. The color component may be based on the RGB color model or another color model. The occupancy frame 710, geometry frame 720, and atlas frame 730 can be employed to code a point cloud 600 and/or point cloud media 500. As such, the occupancy frame 710, geometry frame 720, and atlas frame 730 may be coded by an encoder, such as codec system 200 and/or encoder 300, and reconstructed by a decoder, such as codec system 200 and/or decoder 400, when performing method 100.

The various patches created by projecting 3D information onto 2D planes can be packed into a rectangular (or square) video frame. This approach may be advantageous because various video codecs, such as HEVC, are preconfigured to code such video frames. As such, the PCC codec can employ other video codecs to code the patches. As shown in FIG. 7A, the patches can be packed into a frame. The patches may be packed by any algorithm. For example, the patches can be packed into the frame based on size. In a particular example, the patches are included from largest to smallest. The largest patches may be placed first in any open space, with smaller patches filling in gaps once a size threshold has been crossed. As shown in FIG. 7A, such a packing scheme results in blank space that does not include patch data. To avoid encoding blank space, an occupancy frame 710 is employed. An occupancy frame 710 contains all occupancy data for a point cloud at a particular instant in time. Specifically, the occupancy frame 710 contains one or more occupancy maps (also known as occupancy data, occupancy information, and/or occupancy components). An occupancy map is defined as a 2D array corresponding to an atlas (group of patches) whose values indicate, for each sample position in the atlas, whether that position corresponds to a valid 3D point in the point cloud representation. As shown in FIG. 7A, the occupancy maps include areas of valid data 713. The areas of valid data 713 indicate that atlas/patch data is present in corresponding locations in the occupancy frame 710. The occupancy maps also include areas of invalid data 715. The areas of invalid data 715 indicate that atlas/patch data is not present in corresponding locations in the occupancy frame 710.

FIG. 7B depicts a geometry frame 720 of the point cloud data. The geometry frame 720 contains one or more geometry maps 723 (also known as geometry data, geometry information, and/or geometry components) for a point cloud at a particular instant in time. A geometry map 723 is a 2D array created through the aggregation of the geometry information associated with each patch, where geometry information/data is a set of Cartesian coordinates associated with a point cloud frame. Specifically, the patches are all projected from points in 3D space. Such projection has the effect of removing the 3D information from the patches. The geometry map 723 retains the 3D information removed from the patches. For example, each sample in a patch is obtained from a point in 3D space. Accordingly, the geometry map 723 may include a 3D coordinate associated with each sample in each patch. Hence, the geometry map 723 can be used by a decoder to map/convert the 2D patches back into 3D space to reconstruct the 3D point cloud. Specifically, the decoder can map each patch sample onto the appropriate 3D coordinate to reconstruct the point cloud.

FIG. 7C depicts an atlas frame 730 of the point cloud data. The atlas frame 730 contains one or more atlas 733 (also known as atlas data, atlas information, atlas components, and/or patches) for a point cloud at a particular instant in time. An atlas 733 is a collection of 2D bounding boxes projected into rectangular frames that correspond to a 3D bounding box in 3D space, where each 2D bounding box/patch represents a subset of a point cloud. Specifically, the atlas 733 contains patches created when the 3D point cloud is projected into 2D space as described with respect to FIG. 6. As such, the atlas 733/patches contain the image data (e.g., the color and light values) associated with the point cloud and a corresponding instant in time. The atlas 733 corresponds to the occupancy map of FIG. 7A and the geometry map 723 of FIG. 7B. Specifically, the atlas 733 contains data in areas of valid data 713, and does not contain data in the areas of invalid data 715. Further, the geometry map 723 contains the 3D information for the samples in the atlas 733.

It should also be noted that a point cloud can contain attributes (also known as attribute data, attribute information, and/or attribute components). Such attributes can be included in an atlas frame. An atlas frame may contain all data regarding a corresponding attribute of the point cloud at a particular instant in time. An example of an attribute frame is not shown as attributes may include a wide range of different data. Specifically, an attribute may be any scalar or vector property associated with each point in a point cloud such as reflectance, surface normal, time stamps, material IDs, etc. Further, attributes are optional (e.g., user defined), and may vary based on application. However, when used, the point cloud attributes may be included in an attribute frame in a manner similar to the atlas 733, geometry map 723, and occupancy maps.

Accordingly, an encoder can compress a point cloud frame into an atlas frame 730 of atlas 733, a geometry frame 720 of geometry maps 723, an occupancy frame 710 of occupancy maps, and optionally an attribute frame of attributes. The atlas frame 730, geometry frame 720, occupancy frame 710, and/or attribute frame can be further compressed, for example by different encoders for transmission to a decoder. The decoder can decompress the atlas frame 730, geometry frame 720, occupancy frame 710, and/or attribute frame. The decoder can then employ the atlas frame 730, geometry frame 720, occupancy frame 710, and/or attribute frame to reconstruct the point cloud frame to determine a reconstructed point cloud at a corresponding instant of time. The reconstructed point cloud frames can then be included in sequence to reconstruct the original point cloud sequence (e.g., for display and/or for use in data analysis). As a particular example, the atlas frame 730 and/or atlas 733 may be encoded and decoded by employing the techniques described with respect to FIGS. 1-4, for example by employing an HEVC codec.

Figure 8:
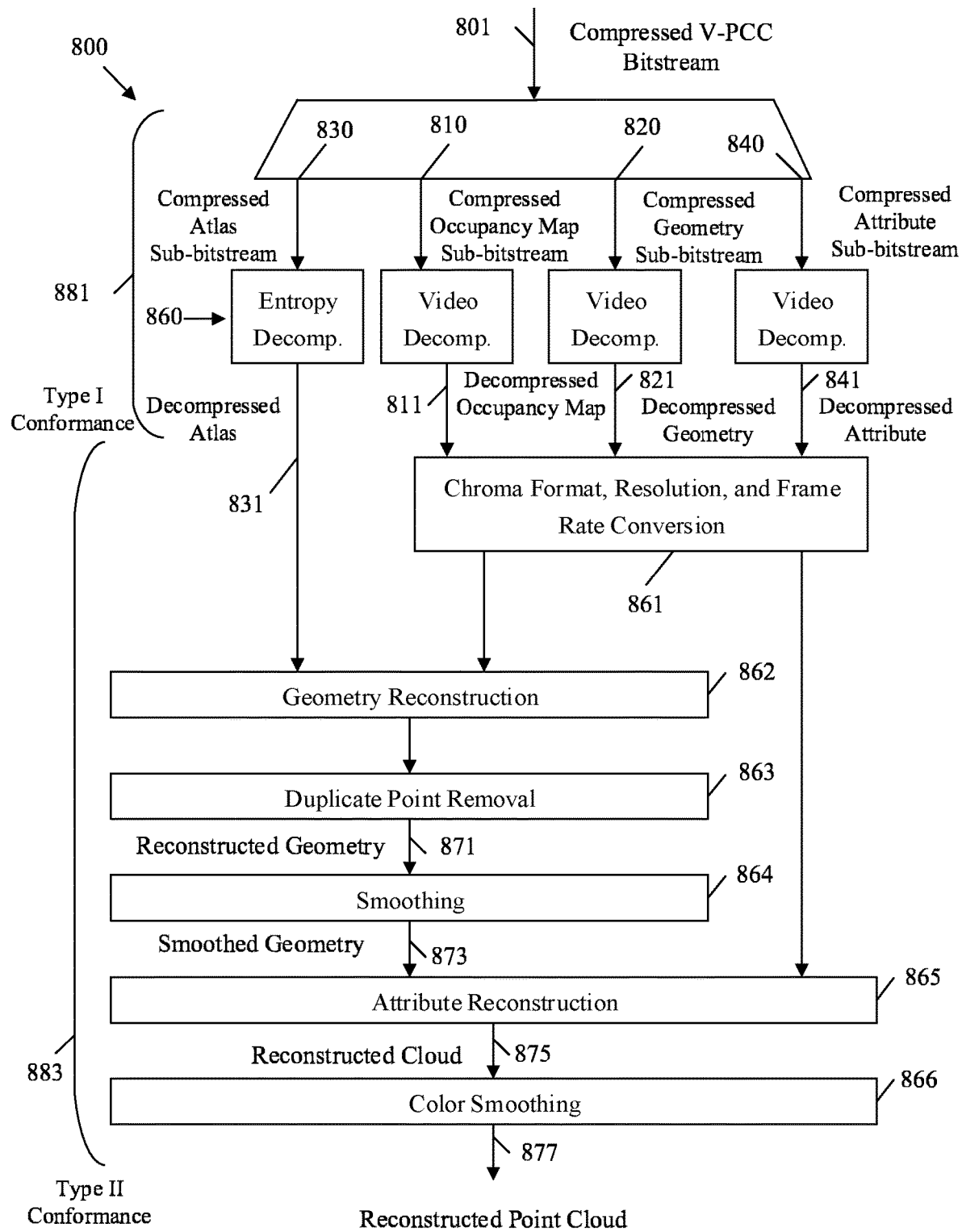
FIG. 8 is a schematic diagram of an example conformance testing mechanism.

FIG. 8 is a schematic diagram of an example conformance testing mechanism 800. The conformance testing mechanism 800 may be employed by an encoder, such as a codec system 200 and/or an encoder 300, to verify that a PCC bitstream conforms with standards, and hence can be decoded by a decoder, such as a codec system 200 and/or a decoder 400. For example, the conformance testing mechanism 800 may be employed to check whether a point cloud media 500 and/or patches 603 have been coded into an occupancy frame 710, a geometry frame 720, an atlas frame 730, and/or an attribute frame in a manner that can be correctly decoded when performing method 100.

The conformance testing mechanism 800 can test a PCC bitstream for conformance with standards. A PCC bitstream that conforms with standards should always be decodable by any decoder that also conforms to standards. A PCC bitstream that does not conform with standards may not be decodable. Hence, a PCC bitstream that fails conformance testing mechanism 800 should be re-encoded, for example by using different settings. The conformance testing mechanism 800 includes a type I conformance test 881 and a type II conformance test 883, which may also be referred to as conformance point A and B, respectively. A type I conformance test 881 checks the components of a PCC bitstream for conformance. A type II conformance test 883 checks a reconstructed point cloud for conformance. An encoder is generally required to perform a type I conformance test 881 and may optionally perform a type II conformance test 883.

Prior to performing conformance testing mechanism 800, the encoder encodes a compressed V-PCC bitstream 801 as described above. The encoder may then employ a HRD to perform the conformance testing mechanism 800 on the compressed V-PCC bitstream 801. The conformance testing mechanism 800 separates the compressed V-PCC bitstream 801 into components. Specifically, the compressed V-PCC bitstream 801 is split into a compressed atlas sub-bitstream 830, a compressed occupancy map sub-bitstream 810, a compressed geometry sub-bitstream 820, and optionally a compressed attribute sub-bitstream 840, which contain sequences of coded atlas frames 730, coded geometry frames 720, occupancy frames 710, and optionally attribute frames, respectively.

Entropy decompression or video decompression 860 is performed on the sub-streams. Entropy decompression or video decompression 860 is a mechanism of reversing the component specific compression. The compressed atlas sub-bitstream 830, compressed occupancy map sub-bitstream 810, compressed geometry sub-bitstream 820, and compressed attribute sub-bitstream 840 may be encoded by one or more codecs, and hence entropy decompression or video decompression 860 includes applying a hypothetical decoder to each sub-bitstream based on the encoder employed to create the corresponding sub-bitstream. The entropy decompression or video decompression 860 reconstructs a decompressed atlas sub-bitstream 831, decompressed occupancy map sub-bitstream 811, decompressed geometry sub-bitstream 821, and decompressed attribute sub-bitstream 841 from the compressed atlas sub-bitstream 830, compressed occupancy map sub-bitstream 810, compressed geometry sub-bitstream 820, and compressed attribute sub-bitstream 840, respectively. A decompressed sub-bitstream/component is data from a sub-bitstream that has been reconstructed as part of a decoding process or, in this case, as part of a HRD conformance test.

A type I conformance test 881 is applied to the decompressed atlas sub-bitstream 831, decompressed occupancy map sub-bitstream 811, decompressed geometry sub-bitstream 821, and decompressed attribute sub-bitstream 841. The type I conformance test 881 checks each component (the decompressed atlas sub-bitstream 831, decompressed occupancy map sub-bitstream 811, decompressed geometry sub-bitstream 821, and decompressed attribute sub-bitstream 841) to ensure the corresponding component complies with the standard used by the codec to encode and decode that component. For example, the type I conformance test 881 can verify that a standardized amount of hardware resources are capable of decompressing the corresponding component without buffer over-runs or under-runs. Further, the type I conformance test 881 can check the components for coding errors that prevent the HRD from correctly reconstructing the corresponding components. In addition, the type I conformance test 881 can check each corresponding component to ensure that all standard requirements are met and that all standard prohibitions are omitted. The type I conformance test 881 is satisfied when all components pass the corresponding tests, and is not satisfied when any one of the components fails a corresponding test. Any component that passes the type I conformance test 881 should be decodable at any decoder that also complies with the corresponding standards. As such, the type I conformance test 881 may be utilized when encoding a compressed V-PCC bitstream 801.

While a type I conformance test 881 ensures that components are decodable, the type I conformance test 881 does not guarantee that a decoder can reconstruct the original point cloud from the corresponding components. Accordingly, conformance testing mechanism 800 may also be employed to perform a type II conformance test 883. The decompressed occupancy map sub-bitstream 811, decompressed geometry sub-bitstream 821, and decompressed attribute sub-bitstream 841 are forwarded for conversion 861. Specifically, conversion 861 may convert the chroma format, resolution, and/or the frame rate of the decompressed occupancy map sub-bitstream 811, decompressed geometry sub-bitstream 821, and decompressed attribute sub-bitstream 841 as desired to match the chroma format, resolution, and/or the frame rate of the decompressed atlas sub-bitstream 831.

The results of conversion 861 as well as the decompressed atlas sub-bitstream 831 are forwarded to geometry reconstruction 862. At geometry reconstruction 862, the occupancy maps from the decompressed occupancy map sub-bitstream 811 are employed to determine the locations of valid atlas data. The geometry reconstruction 862 can then obtain geometry data from the decompressed geometry sub-bitstream 821 from any location that contains valid atlas data. The geometry data can then be employed to reconstruct a rough cloud of points, which is forwarded to duplicate point removal 863. For example, during the creation of 2D patches from a 3D cloud, some cloud points can be viewed from multiple directions. When this happens, the same point is projected as a sample into more than one patch. The geometry data is then generated based on samples, and hence includes duplicate data for such points. The duplicate point removal 863 merges such duplicate data to create a single point when geometry data indicates multiple points are located at the same location. The result is a reconstructed geometry 871 that mirrors the geometry of the originally encoded point cloud. Specifically, the reconstructed geometry 871 includes the 3D position of each point from the encoded point cloud.

The reconstructed geometry 871 is forwarded for smoothing 864. Specifically, the reconstructed geometry 871 may contain certain features that appear sharp due to noise created during the coding process. Smoothing 864 may employ one or more filters to remove such noise in order to create a smoothed geometry 873 that is an accurate representation of the originally encoded point cloud. The smoothed geometry 873 is then forwarded to attribute reconstruction 865 along with atlas data from the decompressed atlas sub-bitstream 831 and attribute data from conversion 861. Attribute reconstruction 865 colors the points located at the smoothed geometry 873 with the colors from the atlas/patch data. Attribute reconstruction 865 also applies any attributes to the points. This results in a reconstructed cloud 875 that mirrors the originally encoded point cloud. The reconstructed cloud 875 may contain color or other attribute noise caused by the coding process. Accordingly, the reconstructed cloud 875 is forwarded for color smoothing 866, which applies one or more filters to the luma, chroma, or other attribute values to smooth such noise. Color smoothing 866 can then output a reconstructed point cloud 877. The reconstructed point cloud 877 should be an exact representation of the originally encoded point cloud if lossless coding is employed. Otherwise, the reconstructed point cloud 877 closely approximates the originally encoded point cloud with variances that do not exceed a predefined tolerance.

The type II conformance test 883 is applied to the reconstructed point cloud 877. The Type II conformance test 883 checks the reconstructed point cloud 877 to ensure the reconstructed point cloud 877 complies with the V-PCC standard, and hence can be decoded by a decoder that complies with the V-PCC standard. For example, the type II conformance test 883 can verify that a standardized amount of hardware resources are capable of reconstructing the reconstructed point cloud 877 without buffer over-runs or under-runs. Further, the type II conformance test 883 can check the reconstructed point cloud 877 for coding errors that prevent the HRD from correctly reconstructing the reconstructed point cloud 877. In addition, the type II conformance test 883 can check each decompressed component and/or any intermediate data to ensure that all standard requirements are met and that all standard prohibitions are omitted. The type II conformance test 883 is satisfied when the reconstructed point cloud 877 and any intermediate components pass the corresponding tests, and is not satisfied when the reconstructed point cloud 877 or any of the intermediate components fails a corresponding test. When the reconstructed point cloud 877 passes the type II conformance test 883, the reconstructed point cloud 877 should be decodable at any decoder that also complies with the V-PCC standard. As such, the type II conformance test 883 may provide a more robust verification of the compressed V-PCC bitstream 801 than the type I conformance test 881.

Figure 9:
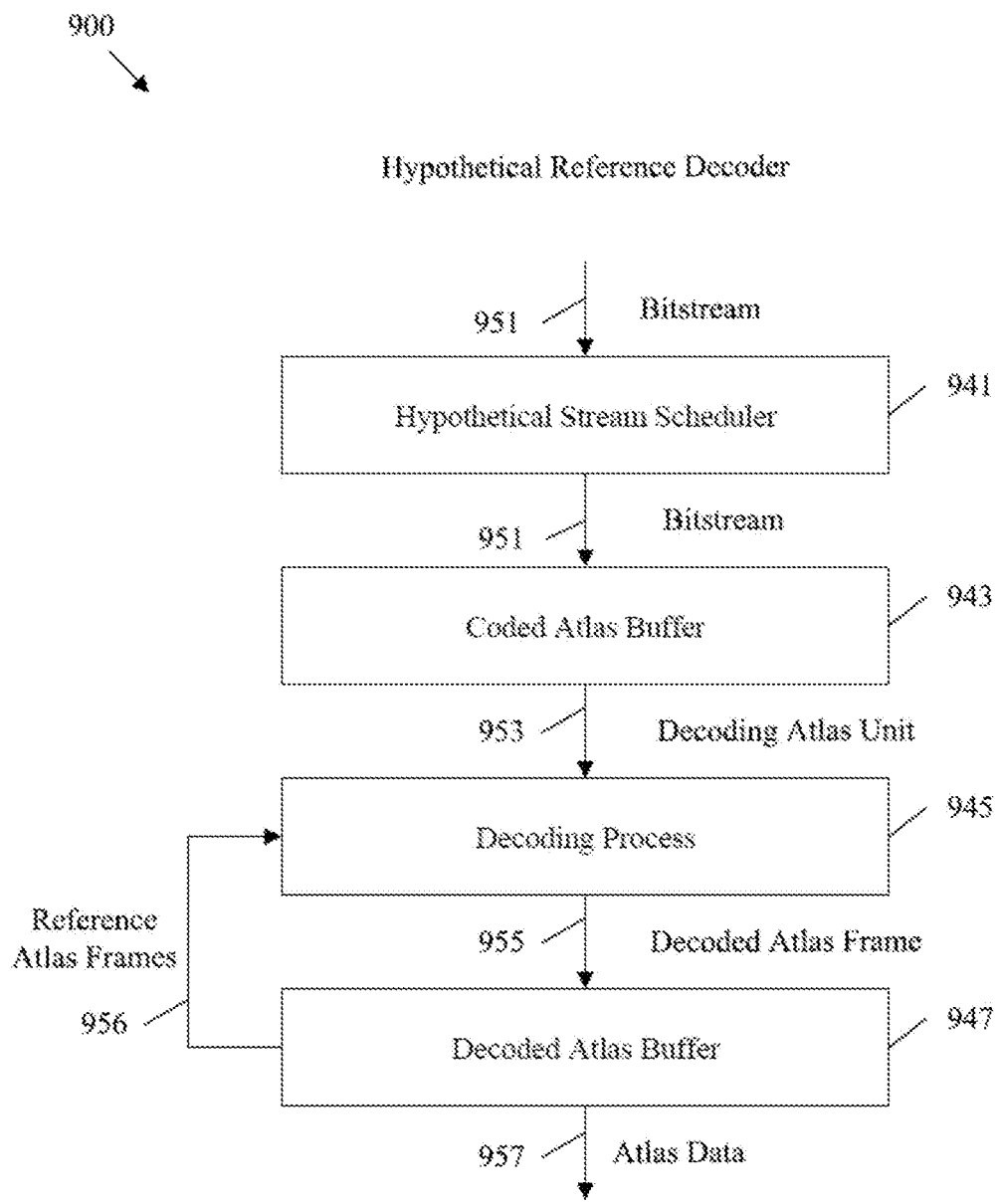
FIG. 9 is a schematic diagram of an example HRD configured to perform a conformance test on a PCC bitstream.

FIG. 9 is a schematic diagram of an example HRD 900 configured to perform a conformance test, for example by employing conformance testing mechanism 800, on a PCC bitstream, which may include a point cloud media 500 and/or patches 603 coded into an occupancy frame 710, a geometry frame 720, an atlas frame 730, and/or an attribute frame. As such, the HRD 900 may be employed by a codec system 200 and/or an encoder 300 that is encoding a bitstream as part of method 100 for decoding by a codec system 200 and/or decoder 400. Specifically, the HRD 900 may check a PCC bitstream and/or components thereof before the PCC bitstream is forwarded to a decoder. In some examples, the PCC bitstream may be continuously forwarded through the HRD 900 as the PCC bitstream is encoded. In the event that a portion of the PCC bitstream fails to conform to associated constraints, the HRD 900 can indicate such failure to an encoder, which may cause the encoder to re-encode the corresponding section of the bitstream with different mechanisms. In some examples, the HRD 900 may be configured to perform checks on an atlas sub-bitstream and/or on a reconstructed point cloud. In some examples, the occupancy map components, geometry components, and attribute components may be encoded by other codecs. Hence, the sub-bitstreams containing the occupancy map components, geometry components, and attribute components may be checked by other HRDs. As such, a plurality of HRDs that include HRD 900 may be employed to completely check a PCC bitstream for conformance in some examples.

The HRD 900 includes an HSS 941. A HSS 941 is a component configured to perform a hypothetical delivery mechanism. The hypothetical delivery mechanism is used for checking the conformance of a bitstream, a sub-bitstream, and/or a decoder with regards to the timing and data flow of a PCC bitstream 951 input into the HRD 900. For example, the HSS 941 may receive a PCC bitstream 951 or a sub-bitstream thereof output from an encoder. The HSS 941 may then manage the conformance testing process on the PCC bitstream 951, for example by employing conformance testing mechanism 800. In a particular example, the HSS 941 can control the rate that coded atlas data moves through the HRD 900 and verify that the PCC bitstream 951 does not contain non-conforming data. The HSS 941 may forward the PCC bitstream 951 to a CAB 943 at a predefined rate. For purposes of the HRD 900, any units containing coded video in the PCC bitstream 951, such as an AU and/or a NAL unit, may be referred to as decoding atlas units 953. Decoding atlas units 953 may contain only atlas data in some examples. In other examples, the decoding atlas units 953 may contain other PCC components and/or a set of data to reconstruct the point cloud. Accordingly, the decoding atlas units 953 may generally be referred to as decoding units in same examples. The CAB 943 is a FIFO buffer in the HRD 900. The CAB 943 contains decoding atlas units 953 including atlas data, geometry data, occupancy data, and/or attribute data, in decoding order. The CAB 943 stores such data for use during PCC bitstream conformance testing/checking.

The CAB 943 forwards the decoding atlas units 953 to a decoding process component 945. The decoding process component 945 is a component that conforms to a PCC standard or other standard employed to code a PCC bitstream and/or sub-bitstream thereof. For example, the decoding process component 945 may emulate a decoder employed by an end user. For example, the decoding process component 945 may perform a type I conformance test by decoding atlas components and/or a type II conformance test by reconstructing point cloud data. The decoding process component 945 decodes the decoding atlas units 953 at a rate that can be achieved by an example standardized decoder. If the decoding process component 945 cannot decode the decoding atlas units 953 fast enough to prevent an overflow of the CAB 943, then the PCC bitstream 951 does not conform to the standard and should be re-encoded. Likewise, if the decoding process component 945 decodes the decoding atlas units 953 too quickly and the CAB 943 runs out of data (e.g., a buffer underrun), then the PCC bitstream 951 does not conform to the standard and should be re-encoded.

The decoding process component 945 decodes the decoding atlas units 953, which creates decoded atlas frames 955. Decoded atlas frames 955 may contain a complete set of atlas data for a PCC frame in the event of a type I conformance test or a frame of a reconstructed point cloud in a type II conformance test context. The decoded atlas frames 955 are forwarded to a DAB 947. The DAB 947 is a FIFO buffer in a HRD 900 that contains decoded/decompressed atlas frames and/or reconstructed point cloud frames (depending on context) in decoding order for use during PCC bitstream conformance testing. The DAB 947 may be substantially similar to a decoded picture buffer component 223, 323, and/or 423. To support inter-prediction, frames that are marked for use as reference atlas frames 956 that are obtained from the decoded atlas frames 955 are returned to the decoding process component 945 to support further decoding. The DAB 947 outputs the atlas data 957 (or reconstructed point clouds, depending on context) on a frame by frame basis. As such, the HRD 900 can determine whether coding is satisfactory and whether constraints are met by the PCC bitstream 951 and/or components thereof.

Figure 10:
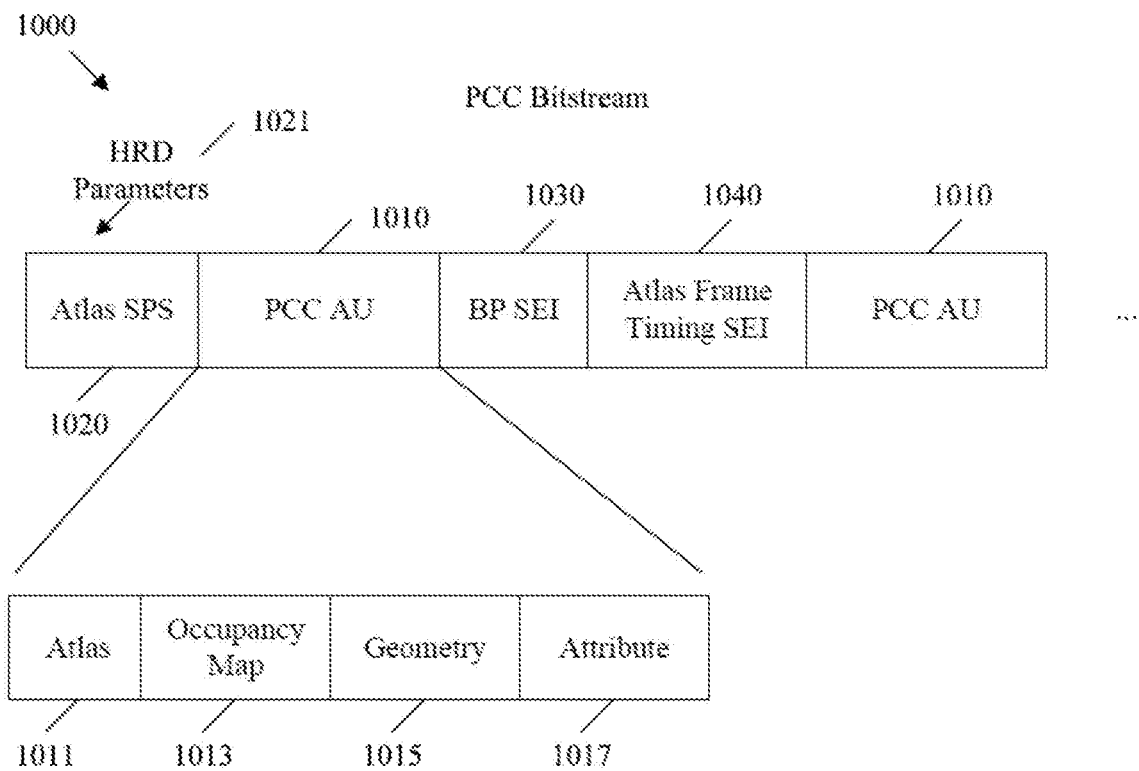
FIG. 10 is a schematic diagram illustrating an example PCC bitstream.

FIG. 10 is a schematic diagram illustrating an example PCC bitstream 1000 for use in initializing a HRD, such as HRD 900, to support HRD conformance tests, such as conformance testing mechanism 800. For example, the bitstream 1000 can be generated by a codec system 200 and/or an encoder 300 for decoding by a codec system 200 and/or a decoder 400 according to method 100. Further, the bitstream 1000 may include a point cloud media 500 and/or patches 603 coded into an occupancy frame 710, a geometry frame 720, an atlas frame 730, and/or an attribute frame. In addition, bitstream 1000 can be checked for conformance by a HRD, such as HRD 900, employing conformance testing mechanisms such as conformance testing mechanism 800.

The PCC bitstream 1000 includes a sequence of PCC AUs 1010. A PCC AU 1010 includes sufficient components to reconstruct a single PCC frame captured at a particular time instance. For example, a PCC AU 1010 may contain an atlas frame 1011, an occupancy map frame 1013, and a geometry map frame 1015, which may be substantially similar to an atlas frame 730, an occupancy frame 710, and a geometry frame 720, respectively. The PCC AU 1010 may also contain an attribute frame 1017, which includes all of the attributes related to the point cloud at the time instance as coded in the PCC AU 1010. Such attributes may include a scalar or vector property optionally associated with each point in a point cloud such as color, reflectance, surface normal, time stamps, and material ID. A PCC AU 1010 may be defined as a set of NAL units that are associated with each other according to a specified classification rule and pertain to one particular output time. As such, data is positioned in the PCC AUs 1010 in NAL units. A NAL unit is a packet sized data container. For example, a single NAL unit is generally sized to allow for network transmission. A NAL unit may contain a header indicating the NAL unit type and a payload that contains the associated data.

The PCC bitstream 1000 also includes various data structures to support decoding the PCC AUs 1010, for example as part of a decoding process and/or as part of a HRD process. For example, the PCC bitstream 1000 may include various parameter sets that contain parameters used to code the one or more PCC AUs 1010. As a specific example, the PCC bitstream 1000 may contain an atlas SPS 1020. An atlas SPS 1020 is a syntax structure containing syntax elements that apply to zero or more entire coded atlas sequences as determined by the content of a syntax element found in the atlas SPS 1020 referred to by a syntax element found in each tile group header. For example, the atlas SPS 1020 may contain parameters that are related to an entire sequence of atlas frames 1011.

The PCC bitstream 1000 also includes various SEI messages. An SEI message is a syntax structure with specified semantics that conveys information that is not needed by decoding processes in order to determine the values of samples in decoded pictures. Accordingly, SEI messages may be employed to convey data that is not directly related to decoding PCC AUs 1010. In the example shown, the PCC bitstream 1000 includes a buffering period SEI message 1030 and an atlas frame timing SEI message 1040.

In the example shown, the atlas SPS 1020, buffering period SEI message 1030, and the atlas frame timing SEI message 1040 are employed to initialize and manage the function of a HRD when performing conformance testing on a PCC bitstream 1000. For example, HRD parameters 1021 may be included in the atlas SPS 1020. The HRD parameters 1021 are syntax elements that initialize and/or define operational conditions of a HRD. For example, the HRD parameters 1021 may be employed to specify a conformance point, such as a type I conformance test 881 or a type II conformance test 883, for a HRD conformance check at the HRD. As such the HRD parameters 1021 may be employed to indicate whether an HRD conformance check should be performed on decompressed PCC components or reconstructed point clouds. For example, the HRD parameters 1021 may be set to a first value to indicate that a HRD conformance check should be performed on decompressed attribute components, decompressed atlas components, decompressed occupancy map components, and decompressed geometry components (e.g., the attribute frame 1017, the atlas frame 1011, the occupancy map frame 1013, and the geometry map frame 1015, respectively.) Further, the HRD parameters 1021 may be set to a first value to indicate that a HRD conformance check should be performed on reconstructed point clouds from the PCC components (e.g., reconstructed from the entire PCC AU 1010).

The buffering period SEI message 1030 is an SEI message that contains data indicating initial removal delays related to a CAB (e.g., CAB 943) in a HRD. An initial CAB removal delay is an amount of time a component in a first AU in a bitstream, such as a PCC AU 1010, or a first AU in a sub-bitstream, such as an atlas frame 1011, can remain in the CAB prior to removal. For example, the HRD can begin removing any decoding units related to the first PCC AU 1010 from the CAB in the HRD during the HRD conformance check based on an initial delay specified by the buffering period SEI message 1030. As such, the buffering period SEI message 1030 contains data sufficient to initialize a HRD conformance testing process to begin at a coded PCC AU 1010 associated with the buffering period SEI message 1030. Specifically, the buffering period SEI message 1030 may indicate to the HRD that conformance testing should begin at the first PCC AU 1010 in the PCC bitstream 1000.

The atlas frame timing SEI message 1040 is an SEI message that contains data indicating a removal delay relating to a CAB (e.g., CAB 943) and an output delay related to a DAB (e.g., DAB 947) in a HRD. A CAB removal delay is an amount of time a component (e.g., any corresponding component) can remain in the CAB prior to removal. The CAB removal delay may be coded in reference to the initial CAB removal delay indicated by the buffering period SEI message 1030. A DAB output delay is an amount of time a decompressed/decoded component (e.g., any corresponding component) can remain in the DAB prior to being output (e.g., as part of a reconstructed point cloud). As such, a HRD may remove decoding units from the CAB in the HRD during conformance checks as specified by the atlas frame timing SEI message 1040. Further, a HRD can set an output delay of a DAB in the HRD as specified by the atlas frame timing SEI message 1040.

Accordingly, the encoder can encode the HRD parameters 1021, buffering period SEI message 1030, and the atlas frame timing SEI message 1040 into the PCC bitstream 1000 during the encoding process. The HRD can then read the HRD parameters 1021, buffering period SEI message 1030, and the atlas frame timing SEI message 1040 to obtain sufficient information to perform a conformance check, such as conformance testing mechanism 800, on the PCC bitstream 1000. Further, a decoder obtain the HRD parameters 1021, buffering period SEI message 1030, and/or the atlas frame timing SEI message 1040 from the PCC bitstream 1000 and infer by the presence of such data that a HRD check has been performed on the PCC bitstream 1000. Hence, the decoder can infer that the PCC bitstream 1000 is decodable, and hence can decode the PCC bitstream 1000 based on the HRD parameters 1021, buffering period SEI message 1030, and/or the atlas frame timing SEI message 1040.

The PCC bitstream 1000 may be of varying sizes and may be transmitted from an encoder to a decoder via a transmission network at various rates. For example, an volumetric sequence that is approximately one hour in length can be encoded into a PCC bitstream 1000 with a file size of between fifteen and seventy gigabytes when an HEVC based encoder is employed. A VVC based encoder may further reduce the file size by about thirty to thirty five percent versus the HEVC encoder. Accordingly, a volumetric sequence of an hour in length that is encoded with a VVC encoder may result in a file with a size of about ten to forty nine gigabytes. A PCC bitstream 1000 may be transmitted at different rates depending on the status of the transmission network. For example, a PCC bitstream 1000 may be transmitted across a network at a bit rate of between five to twenty megabytes per second. Similarly, encoding and decoding processes described herein can be performed, for example, at rates faster than one megabyte per second.

Figure 11:
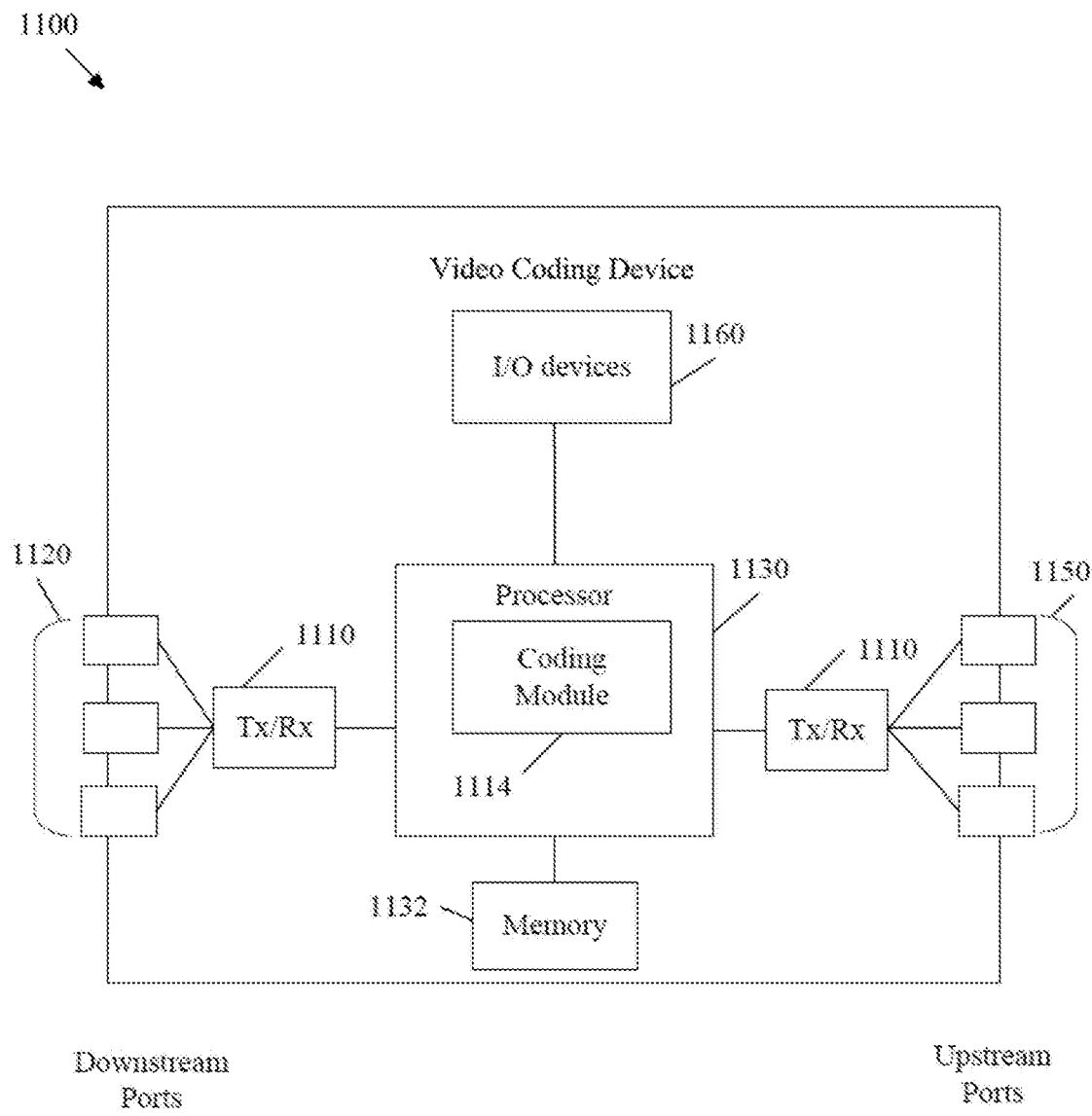
FIG. 11 is a schematic diagram of an example video coding device.

FIG. 11 is a schematic diagram of an example video coding device 1100. The video coding device 1100 is suitable for implementing the disclosed embodiments. The video coding device 1100 comprises downstream ports 1120, upstream ports 1150, and TX/RXs 1110, including transmitters or transmitting means and including receivers or receiving means for communicating data over a network. The video coding device 1100 also includes a processor 1130 or processing means including a logic unit or CPU to process the data and a memory 1132 or storage means for storing the data. The video coding device 1100 may also comprise electrical, OE components, EO components, or wireless communication components coupled to the upstream ports 1150 or downstream ports 1120 for communication of data via electrical, optical, or wireless communication networks. The video coding device 1100 may also include I/O devices 1160 for communicating data to and from a user. The I/O devices 1160 may include output devices such as a display for displaying video data, speakers for outputting audio data, etc. The I/O devices 1160 may also include input devices, such as a keyboard, mouse, trackball, etc., and/or corresponding interfaces for interacting with such output devices.

The processor 1130 is implemented by hardware and software. The processor 1130 may be implemented as one or more CPU chips, cores (e.g., as a multi-core processor), FPGAs, ASICs, and DSPs. The processor 1130 is in communication with the downstream ports 1120, Tx/Rx 1110, upstream ports 1150, and memory 1132. The processor 1130 comprises a coding module 1114. The coding module 1114 implements the disclosed embodiments described herein, such as methods 100, 1200, and 1300, which may employ point cloud media 500 separated into a set of patches 603 and encoded into an occupancy frame 710, a geometry frame 720, and an atlas frame 730 in a PCC bitstream 1000. Further, the coding module 1114 may implement a HRD 900 that performs a conformance testing mechanism 800 on the PCC bitstream 1000. The coding module 1114 may also implement any other method/mechanism described herein. Further, the coding module 1114 may implement a codec system 200, an encoder 300, and/or a decoder 400. Alternatively, the coding module 1114 can be implemented as instructions stored in the memory 1132 and executed by the processor 1130 (e.g., as a computer program product stored on a non-transitory medium).

The memory 1132 comprises one or more memory types such as disks, tape drives, solid-state drives, ROM, RAM, flash memory, TCAM, SRAM, etc. The memory 1132 may be used as an over-flow data storage device, to store programs when such programs are selected for execution, and to store instructions and data that are read during program execution.

A point cloud is a volumetric representation of space on a regular 3D grid. A voxel in a point cloud has x, y, and z coordinates and may have RGB color components, reflectance, or other attributes. The data representation in V-PCC relies on 3D-to-2D conversion and is described as a set of planar 2D images with four types of data, which are referred to as components: occupancy maps, geometry data, attribute data, and atlas frames. An occupancy map is a binary image indication of occupied or unoccupied blocks in the 2D projection. Geometry data are a height map for patch data, which describes per-point differences in distances from the patch projection plane. Attribute data are 2D texture maps of corresponding components that represent attribute values at corresponding 3D points of the point cloud. An atlas frame is metadata information that is required to perform 2D-to-3D conversion. To provide an accurate reconstruction process, the bitstream needs timing information for all of the components. However, there is currently not a mechanism for such timing information.

Disclosed herein are embodiments for V-PCC timing information. The embodiments provide timing_info_present_flag, num_units_in_tick, time_scale, poc_proportional_to_timing_flag, and num_ticks_poc_diff_one_minus1 as syntax elements in the bitstream. Those syntax elements provide timing information, and thus a more accurate reconstruction process.

The following modifications are implemented for the ASPS structure in order to provide mechanisms for timing, or temporal, alignment of sub-stream elements, or components, of the V-PCC bitstream.

A bitstream, for instance the PCC bitstream 1000, may implement the following ASPS syntax.

| ASPS Syntax | |
|---|---|
| | Descriptor |
| atlas_sequence_parameter_set( ) { | |
|   asps_atlas_sequence_parameter_set_id | ue(v) |
|   asps_frame_width[ j ] | u(16) |
|   asps_frame_height[ j ] | u(16) |
|   asps_avg_frame_rate_present_flag[ j ] | u(1) |
|   if( asps_avg_frame_rate_present_flag[ j ] ) | |
|     asps_avg_frame_rate[ j ] | u(16) |
|   asps_log2_patch_packing_block_size | u(3) |
|   asps_log2_max_atlas_frame_order_cnt_lsb_minus4 | ue(v) |
|   asps_max_dec_atlas_frame_buffering_minus1 | ue(v) |
|   asps_long_term_ref_atlas_frames_flag | u(1) |
|   asps_num_ref_atlas_frame_lists_in_asps | ue(v) |
|   for( j = 0; j < asps_num_ref_atlas_frame_lists_in_asps; j++ ) | |
|     ref_list_struct( j ) | |
|   asps_use_eight_orientations_flag | u(1) |
|   asps_45degree_projection_patch_present_flag | u(1) |
|   asps_normal_axis_limits_quantization_enable_flag | u(1) |
|   asps_normal_axis_max_delta_value_enable_flag | u(1) |
|   asps_remove_duplicate_point_enabled_flag | u(1) |
|   asps_pixel_deinterleaving_flag | u(1) |
|   asps_patch_precedence_order_flag | u(1) |
|   asps_enhanced_occupancy_map_for_depth_flag | u(1) |
|   asps_point_local_reconstruction_enabled_flag | u(1) |
|   if( asps_point_local_reconstruction_enabled_flag ) | |
|     point_local_reconstruction_information( ) | |
|   asps_sub_layer_ordering_info_present_flag | u(1) |
|   for( i = ( asps_sub_layer_ordering_info_present_flag ? 0 : asps_max_sub_layers_minus1 ); i <= asps_max_sub_layers_minus1; i++ ) { | |
|     asps_max_dec_atlas_buffering_minus1[ i ] | ue(v) |
|     asps_max_num_reorder_atlases[ i ] | ue(v) |
|     asps_max_latency_increase_plus1[ i ] | ue(v) |
|   } | |
|   asps_max_layer_id | u(6) |
|   asps_num_layer_sets_minus1 | ue(v) |
|   for( i = 1; i <= asps_num_layer_sets_minus1; i++ ) | |
|     for( j = 0; j <= asps_max_layer_id; j++ ) | |
|       layer_id_included_flag[ i ][ j ] | u(1) |
|   asps_timing_info_present_flag | u(1) |
|   if( asps_timing_info_present_flag ) { | |
|     asps_num_units_in_tick | u(32) |
|     asps_time_scale | u(32) |
|     asps_poc_proportional_to_timing_flag | u(1) |
|     if( asps_poc_proportional_to_timing_flag ) | |
|       asps_num_ticks_poc_diff_one_minus1 | ue(v) |
|     asps_num_hrd_parameters | ue(v) |
|     for( i = 0; I < asps_num_hrd_parameters; i++ ) { | |
|       hrd_layer_set_idx[ i ] | ue(v) |
|       if( i > 0 ) | |
|         cprms_present_flag[ i ] | u(1) |
|       hrd_parameters( cprms_present_flag[ i ] ) | |
|     } | |
|   } | |
|   rbsp_trailing_bits( ) | |
| } | |

The following semantics define the syntax above:

asps_sub_layer_ordering_info_present_flag equal to 1 specifies that asps_max_dec_atlas_buffering_minus1[i], asps_max_num_reorder_atlases[i] and asps_max_latency_increaseplus1[i] are present for asps_max_sub_layers_minus1+1 sub-layers. asps_sub_layer_ordering_info_present_flag equal to 0 specifies that the values of asps_max_dec_atlas_buffering_minus1[asps_max_sub_layers_minus1], asps_max_num_reorder_atlases[asps_max_sub_layers_minus1] and asps_max_latency_increase-plus1[asps_max_sub_layers_minus1] apply to all sub-layers.

asps_max_dec_atlas_buffering_minus1[i] plus 1 specifies the maximum required size of the decoded picture buffer for the CPS in units of picture storage buffers when HighestTid is equal to i. The value of asps_max_dec_atlas_buffering_minus1 [i] shall be in the range of 0 to MaxDpbSize−1, inclusive, where MaxDpbSize is as specified in clause A.4. Clause A.4 may refer to clause A.4 of ISO/IEC, "Information technology—Coded Representation of Immersive Media—Part 5: Visual Volumetric Video-based Coding (V3C) and Video-based Point Cloud Compression (V-PCC)," Sep. 2, 2020 ("ISO/IEC V-PCC"), or to a related clause of another version of ISO/IEC V-PCC. When i is greater than 0, asps_max_dec_atlas_buffering_minus1[i] shall be greater than or equal to asps_max_dec_atlas_buffering_minus1[i−1]. The value of asps_max_dec_atlas_buffering_minus1 [i] shall be less than or equal to vps_max_dec_pic_buffering_minus1[i] for each value of i. When asps_max_dec_atlas_buffering_minus1[i] is not present for i in the range of 0 to asps_max_sub_layers_minus1−1, inclusive, due to asps_sub_layer_ordering_info_present_flag being equal to 0, it is inferred to be equal to asps_max_dec_atlas_buffering_minus1 [asps_max_sub_layers_minus1].

asps_max_num_reorder_atlases[i] indicates the maximum allowed number of pictures with PicOutputFlag equal to 1 that can precede any picture with PicOutputFlag equal to 1 in the CPS in decoding order and follow that picture with PicOutputFlag equal to 1 in output order when HighestTid is equal to i. The value of asps_max_num_reorder_atlases[i] shall be in the range of 0 to asps_max_dec_atlas_buffering_minus1 [i], inclusive. When i is greater than 0, asps_max_num_reorder_atlases[i] shall be greater than or equal to asps_max_num_reorder_atlases[i−1]. The value of asps_max_num_reorder_atlases[i] shall be less than or equal to vps_max_num_reorder_pics[i] for each value of i. When asps_max_num_reorder_atlases[i] is not present for i in the range of 0 to asps_max_sub_layers_minus1−1, inclusive, due to asps_sub_layer_ordering_info_present_flag being equal to 0, it is inferred to be equal to asps_max_num_reorder_atlases[asps_max_sub_layers_minus1].

asps_max_latency_increase_plus1[i] not equal to 0 is used to compute the value of SpsMaxLatencyPictures[i], which specifies the maximum number of pictures with PicOutputFlag equal to 1 that can precede any picture with PicOutputFlag equal to 1 in the CPS in output order and follow that picture with PicOutputFlag equal to 1 in decoding order when HighestTid is equal to i.

When asps_max_latency_increase_plus1[i] is not equal to 0, the value of AspsMaxLatencyAtlases[i] is specified as follows:

AspsMaxLatencyAtlases[$i$]=asps_max_num_reorder_atlases[$i$]+asps_max_latency_increase_plus1[$i$]−1

When asps_max_latency_increase_plus1[i] is equal to 0, no corresponding limit is expressed.

The value of asps_max_latency_increase_plus1[i] shall be in the range of 0 to $2^{32}-2$, inclusive. When asps_max_latency_increase_plus1[i] is not present for i in the range of 0 to asps_max_sub_layers_minus1−1, inclusive, due to asps_sub_layer_ordering_info_present_flag being equal to 0, it is inferred to be equal to asps_max_latency_increase_plus1[asps_max_sub_layers_minus1].

asps_max_layer_id specifies the maximum allowed value of nuh_layer_id of all NAL units in each CPS referring to the ASPS. asps_max_layer_id shall be less than 63 in bitstreams conforming to this version of this Specification. "Specification" may refer to ISO/IEC V-PCC or another version of ISO/IEC V-PCC. The value of 63 for asps_max_layer_id is reserved for future use by ITU-T ISO/IEC. Although the value of asps_max_layer_id is required to be less than 63 in this version of this Specification, decoders shall allow a value of asps_max_layer_id equal to 63 to appear in the syntax.

asps_num_layer_sets_minus1 plus 1 specifies the number of layer sets that are specified by the ASPS. The value of asps_num_layer_sets_minus1 shall be in the range of 0 to 1023, inclusive.

asps timing_info_present_flag equal to 1 specifies that asps_num_units_in_tick, asps_time_scale, asps_poc_proportional_to_timing_flag, and vps_num_hrd_parameters are present in the VPS or the ASPS. asps timing_info_present_flag equal to 0 specifies that asps_num_units_in_tick, asps_time_scale, asps_poc_proportional_to_timing_flag, and vps_num_hrd_parameters are not present in the ASPS.

Both VPS and ASPS are syntax structures. VPS is defined as a syntax structure containing syntax elements that apply to zero or more entire CVSs as determined by the content of a syntax element found in the VPS referred to by a syntax element found in the V3C unit header. ASPS is defined as a syntax structure containing syntax elements that apply to zero or more entire coded atlas sequences as determined by the content of a syntax element found in the ASPS referred to by a syntax element found in each tile header. Both "VPS" and "ASPS" may be replaced by "VUI." Thus, "asps timing_info_present_flag" may be "vui timing_info_present_flag," "asps_num_units_in_tick" may be "vui_num_units_in_tick," "asps_time_scale" may be "vui_time_scale," and "asps_poc_proportional_to_timing_flag" may be "vui_poc_proportional_to_timing_flag."

asps_num_units_in_tick is the number of time units of a clock operating at the frequency asps_time_scale Hz that corresponds to one increment (called a clock tick) of a clock tick counter. The value of asps_num_units_in_tick shall be greater than 0. A clock tick, in units of seconds, is equal to the quotient of asps_num_units_in_tick divided by asps_time_scale. For example, when the atlas rate of an atlas sub-bitstream signal is 25 Hz, asps_time_scale may be equal to 27 000 000 and asps_num_units_in_tick may be equal to 1 080 000, and consequently a clock tick may be 0.04 seconds. "asps_num_units_in_tick" may be simply "num_units_in_tick," and "asps_time_scale" may be simply "time_scale."

asps_time_scale is the number of time units that pass in one second. For example, a time coordinate system that measures time using a 27 MHz clock has an asps_time_scale of 27 000 000. The value of asps_time_scale shall be greater than 0. Again, "ASPS" may be replaced by "VUI." Thus, "asps_time_scale" may be "vui_time_scale."

asps_poc_proportional_to_timing_flag equal to 1 indicates that the picture order count value for each picture in the CPS that is not the first picture in the CPS, in decoding order, is proportional to the output time of the picture relative to the output time of the first picture in the CPS. asps_poc_proportional_to_timing_flag equal to 0 indicates that the picture order count value for each picture in the CPS that is not the first picture in the CPS, in decoding order, may or may not be proportional to the output time of the picture relative to the output time of the first picture in the CPS. Again, "ASPS" may be replaced by "VUI." Thus, asps_poc_proportional_to_timing_flag may be vui_poc_proportional_to_timing_flag. In addition, "picture order count value" may be "atlas frame order count value," "picture" may be "atlas," and "CPS" may be "CAS" or simply "CS."

asps_num_ticks_poc_diff_one_minus1 plus 1 specifies the number of clock ticks corresponding to a difference of picture order count values equal to 1. The value of asps_num_ticks_poc_diff_one_minus1 shall be in the range of 0 to $2^{32}$-2, inclusive. Again, "ASPS" may be replaced by "VUI." Thus, "asps_num_ticks_poc_diff_one_minus1" may be "vui_num_ticks_poc_diff_one_minus1." Again, "picture" may be "atlas frame."

asps_num_hrd_parameters specifies the number of hrd_parameters( ) syntax structures present in the ASPS RBS. The value of asps_num_hrd_parameters shall be in the range of 0 to asps_num_layer_sets_minus1+1, inclusive.

hrd_layer_set_idx[i] specifies the index, into the list of layer sets specified by the ASPS, of the layer set to which the i-th hrd_parameters( ) syntax structure in the ASPS applies. The value of hrd_layer_set_idx[i] shall be in the range of (asps_base_layer_internal_flag?0:1) to asps_num_layer_sets_minus1, inclusive.

It may be a requirement of bitstream conformance that the value of hrd_layer_set_idx[i] shall not be equal to the value of hrd_layer_set_idx[j] for any value of j not equal to i.

cprms_present_flag[i] equal to 1 specifies that the HRD parameters that are common for all sub-layers are present in the i-th hrd_parameters( ) syntax structure in the ASPS. cprms_present_flag[i] equal to 0 specifies that the HRD parameters that are common for all sub-layers are not present in the i-th hrd_parameters( ) syntax structure in the ASPS and are derived to be the same as the (i−1)-th hrd_parameters( ) syntax structure in the ASPS. cprms_present_flag[0] is inferred to be equal to 1.

The following syntax implements PUI elements for temporal indication of a point cloud frame in the bitstream:

| | Descriptor |
|---|---|
| pui_parameters( ) { | |
|   pui_timing_info_present_flag | u(1) |
|   if( pui_timing_info_present_flag ) { | |
|     pui_num_units_in_tick | u(32) |
|     pui_time_scale | u(32) |
|     pui_poc_proportional_to_timing_flag | u(1) |
|     if( pui_poc_proportional_to_timing_flag ) | |
|       pui_num_ticks_poc_diff_one_minus1 | ue(v) |
|     pui_hrd_parameters_present_flag | u(1) |
|     if( pui_hrd_parameters_present_flag ) | |
|       hrd_parameters( 1, asps_max_sub_layers_minus1 ) | |
|   } | |
| } | |

The following semantics define the syntax above:

pui_timing_info_present_flag equal to 1 specifies that pui_num_units_in_tick, pui_time_scale, pui_poc_proportional_to_timing_flag, and pui_hrd_parameters_present_flag are present in the pui_parameters( ) syntax structure. pui_timing_info_present_flag equal to 0 specifies that pui_num_units_in_tick, pui_time_scale, pui_poc_proportional_to_timing_flag, and pui_hrd_parameters_present_flag are not present in the pui_parameters( ) syntax structure.

pui_num_units_in_tick is the number of time units of a clock operating at the frequency pui_time_scale Hz that corresponds to one increment (called a clock tick) of a clock tick counter. pui_num_units_in_tick shall be greater than 0.

A clock tick, in units of seconds, is equal to the quotient of pui_num_units_in_tick divided by pui_time_scale. For example, when the picture rate of a video signal is 25 Hz, pui_time_scale may be equal to 27 000 000 and pui_num_units_in_tick may be equal to 1 080 000 and consequently a clock tick may be equal to 0.04 seconds.

pui_time_scale is the number of time units that pass in one second. For example, a time coordinate system that measures time using a 27 MHz clock has a pui_time_scale of 27 000 000. The value of pui_time_scale shall be greater than 0.

pui_poc_proportional_to_timing_flag equal to 1 indicates that the point cloud order count value for each point cloud in the CPS that is not the first point cloud in the CPS, in decoding order, is proportional to the output time of the point cloud relative to the output time of the first point cloud in the CPS. pui_poc_proportional_to_timing_flag equal to 0 indicates that the point cloud order count value for each point cloud in the CPS that is not the first point cloud in the CPS, in decoding order, may or may not be proportional to the output time of the point cloud relative to the output time of the first point cloud in the CPS.

pui_num_ticks_poc_diff_one_minus1 plus 1 specifies the number of clock ticks corresponding to a difference of point cloud order count values equal to 1. The value of pui_num_ticks_poc_diff_one_minus1 shall be in the range of 0 to $2^{32}-2$, inclusive.

pui_hrd_parameters_present_flag equal to 1 specifies that the syntax structure hrd_parameters( ) is present in the pui_parameters( ) syntax structure. pui_hrd_parameters_present_flag equal to 0 specifies that the syntax structure hrd_parameters( ) is not present in the pui_parameters( ) syntax structure.

Figure 12:
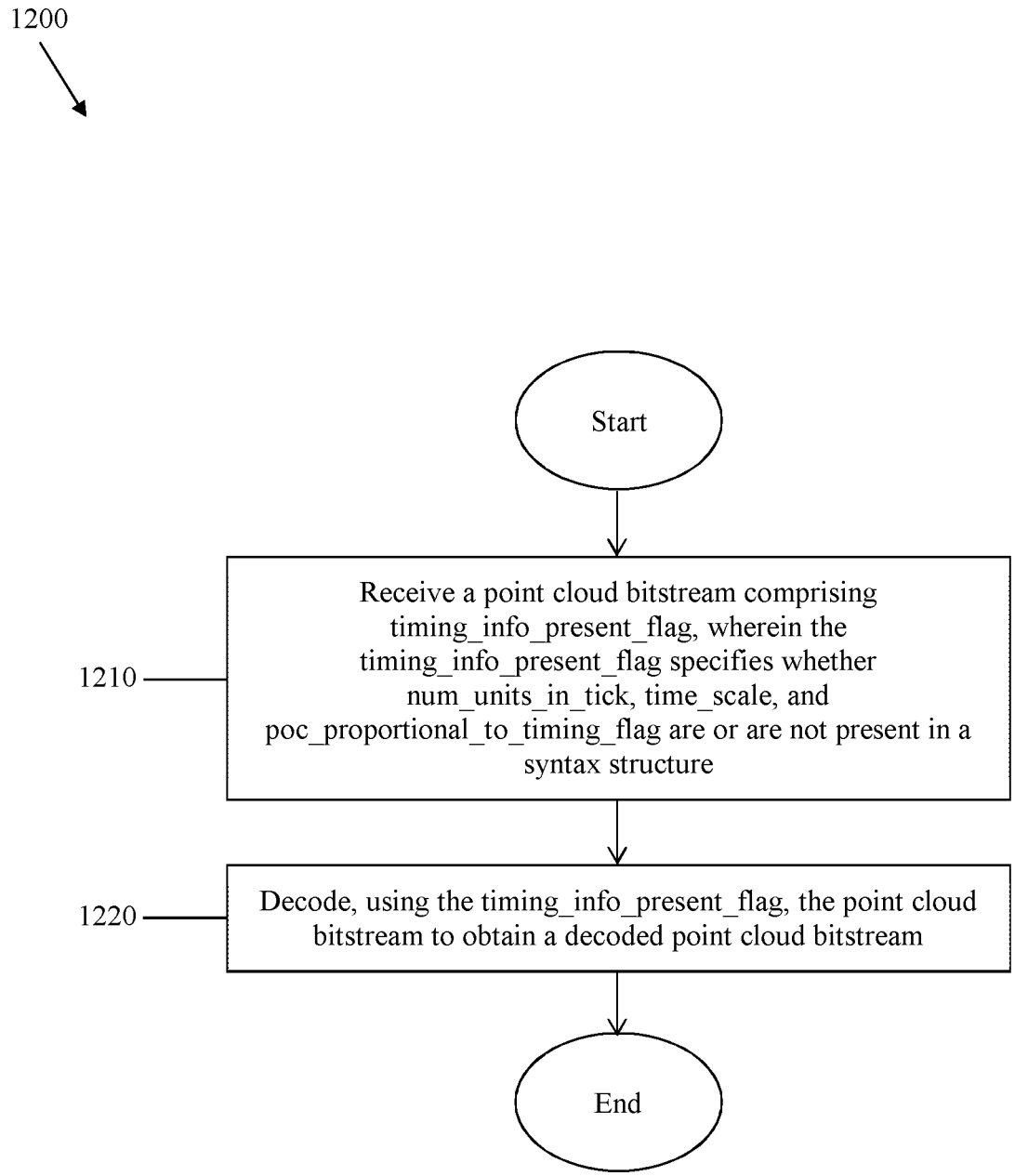
FIG. 12 is a flowchart illustrating a method of decoding a point cloud bitstream according to a first embodiment.

FIG. 12 is a flowchart illustrating a method 1200 of decoding a point cloud bitstream according to a first embodiment. The decoder 400 may implement the method 1200. The decoder 400 may be a PCC decoder. At step 1210, a point cloud bitstream comprising timing_info_present_flag is received. The timing_info_present_flag specifies whether num_units_in_tick, time_scale, and poc_proportional_to_timing_flag are or are not present in a syntax structure. At step 1220, the point cloud bitstream is decoded using the timing_info_present_flag to obtain a decoded point cloud bitstream. In an embodiment, a point cloud media (e.g., point cloud media 500) may be obtained from the decoded point cloud bitstream and used to generate or produce an image or video sequence for display to a user on the display or screen of an electronic device (e.g., a smart phone, tablet, laptop, personal computer).

The method 1200 may implement additional embodiments. For instance, the timing_info_present_flag equal to 1 specifies that the num_units_in_tick, the time_scale, and the poc_proportional_to_timing_flag are present in the syntax structure. The timing_info_present_flag equal to 0 specifies that the num_units_in_tick, the time_scale, and the poc_proportional_to_timing_flag are not present in the syntax structure.

Figure 13:
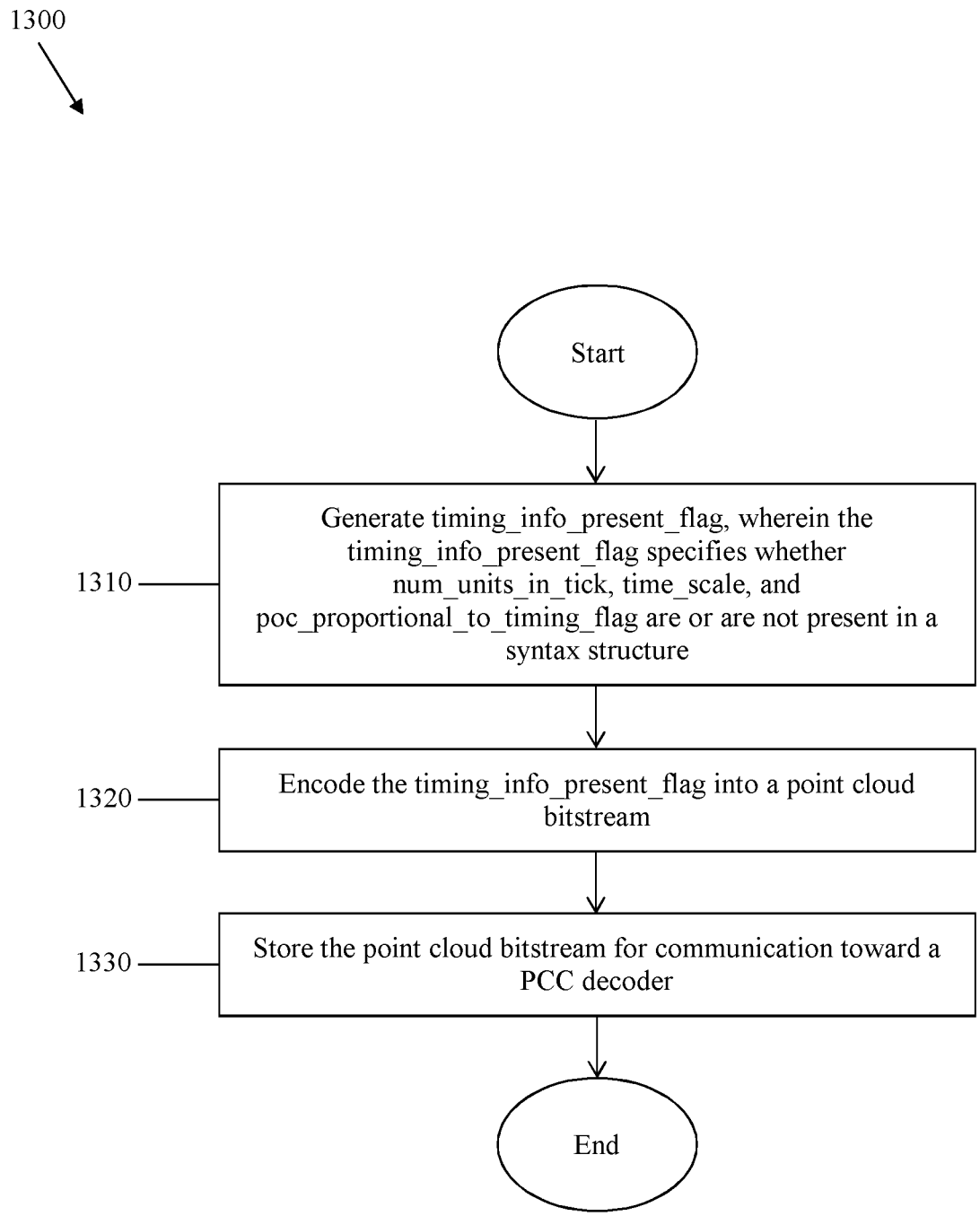
FIG. 13 is a flowchart illustrating a method of encoding a point cloud bitstream according to the first embodiment.

FIG. 13 is a flowchart illustrating a method 1300 of encoding a point cloud bitstream according to the first embodiment. The encoder 300 may implement the method 1300. The encoder 300 may be a PCC encoder. At step 1310, timing_info_present_flag is generated. The timing_info_present_flag specifies whether num_units_in_tick, time_scale, and poc_proportional_to_timing_flag are or are not present in a syntax structure. At step 1320, the timing_info_present_flag is encoded into a point cloud bitstream. At step 1330, the point cloud bitstream is stored for communication toward a PCC decoder.

Figure 14:
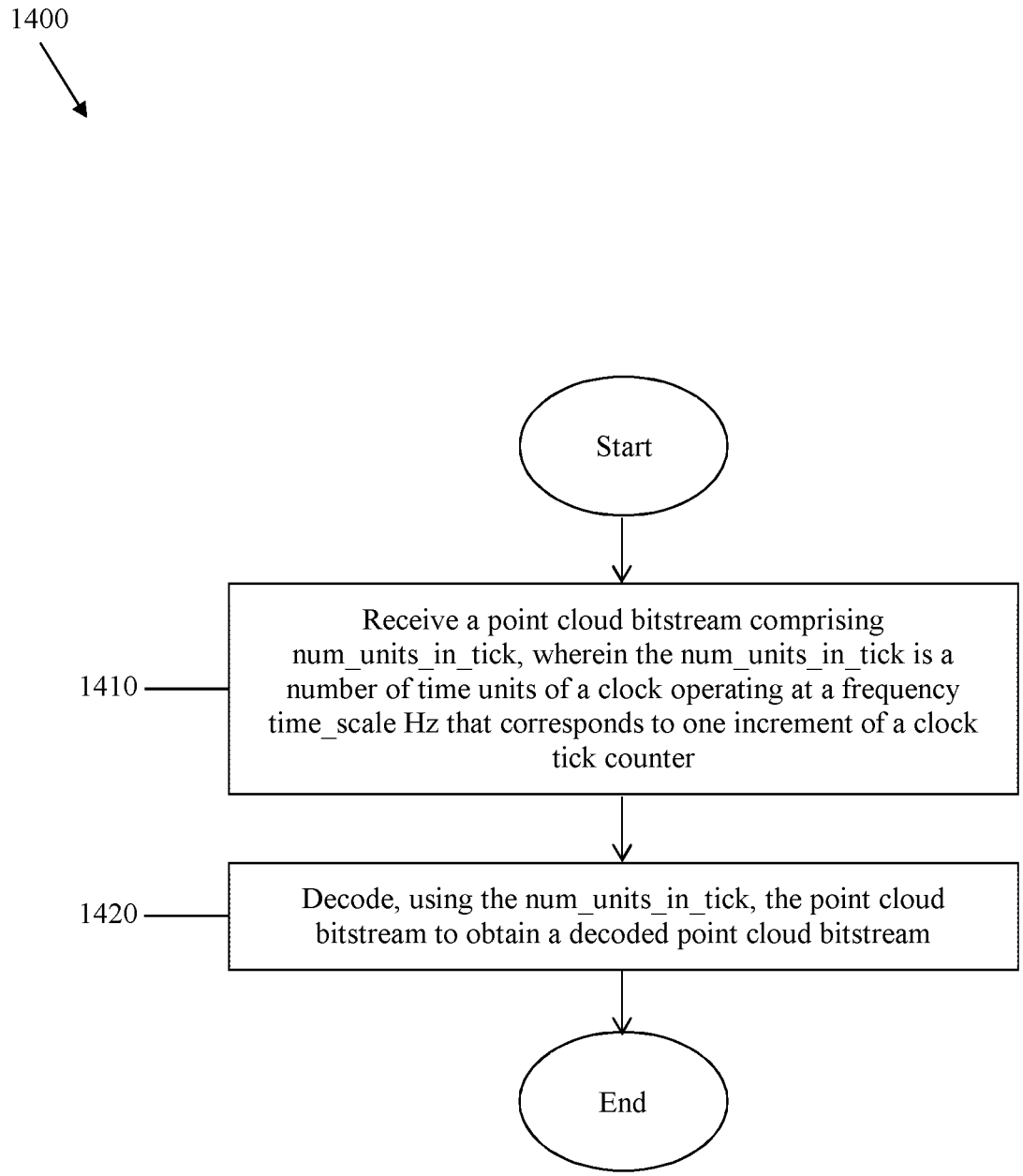
FIG. 14 is a flowchart illustrating a method of decoding a point cloud bitstream according to a second embodiment.

FIG. 14 is a flowchart illustrating a method 1400 of decoding a point cloud bitstream according to a second embodiment. The decoder 400 may implement the method 1400. The decoder 400 may be a PCC decoder. At step 1410, a point cloud bitstream comprising num_units_in_tick is received. The num_units_in_tick is a number of time units of a clock operating at a frequency time_scale Hz that corresponds to one increment of a clock tick counter. At step 1420, the point cloud bitstream is decoded using the num_units_in_tick to obtain a decoded point cloud bitstream. In an embodiment, a point cloud media (e.g., point cloud media 500) may be obtained from the decoded point cloud bitstream and used to generate or produce an image or video sequence for display to a user on the display or screen of an electronic device (e.g., a smart phone, tablet, laptop, personal computer).

The method 1400 may implement additional embodiments. For instance, the one increment is called a clock tick. The num_units_in_tick shall be greater than 0. A clock tick, in units of seconds, is equal to a quotient of the num_units_in_tick divided by the time_scale. The method 1400 may be combined with the method 1200.

Figure 15:
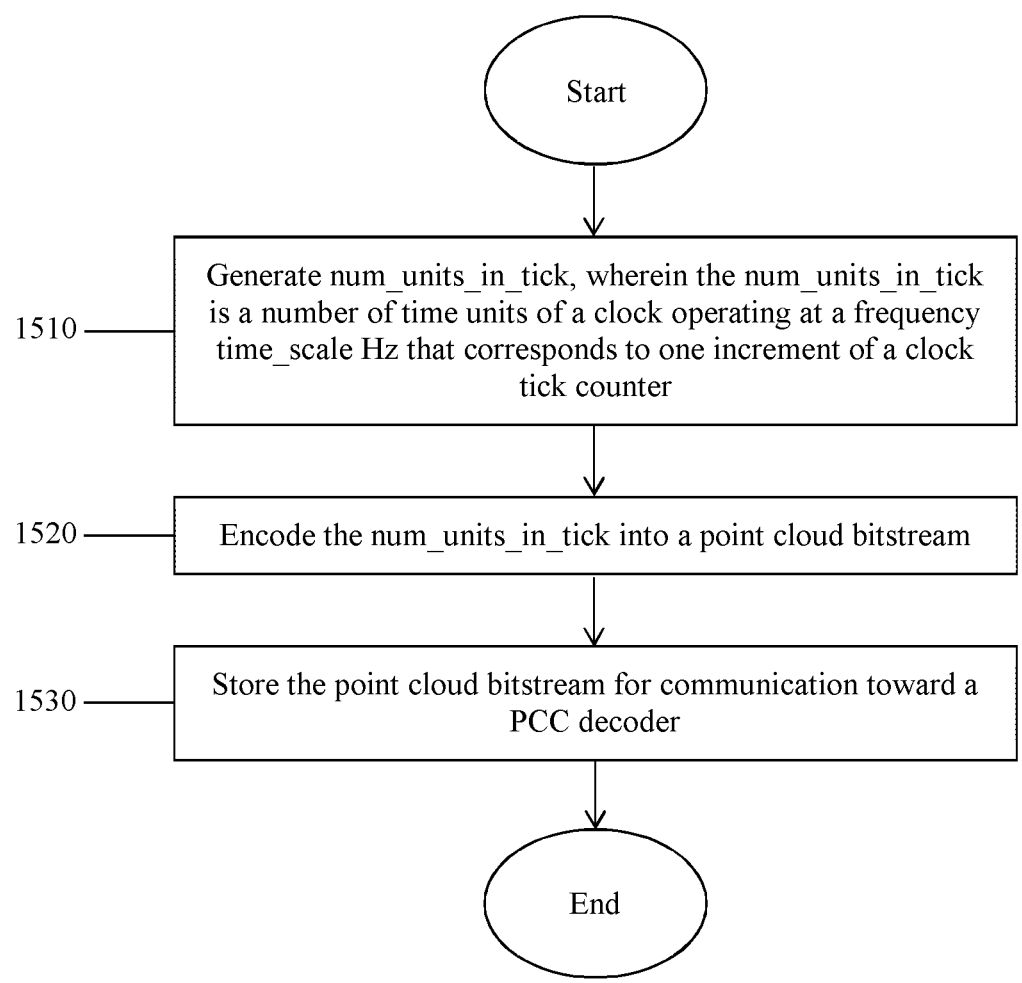
FIG. 15 is a flowchart illustrating a method of encoding a point cloud bitstream according to the second embodiment.

FIG. 15 is a flowchart illustrating a method 1500 of encoding a point cloud bitstream according to the second embodiment. The encoder 300 may implement the method 1500. The encoder 300 may be a PCC encoder. At step 1510, num_units_in_tick is generated. The num_units_in_tick is a number of time units of a clock operating at a frequency time_scale Hz that corresponds to one increment of a clock tick counter. At step 1520, the num_units_in_tick is encoded into a point cloud bitstream. At step 1530, the point cloud bitstream is stored for communication toward a PCC decoder. The method 1500 may be combined with the method 1300.

Figure 16:
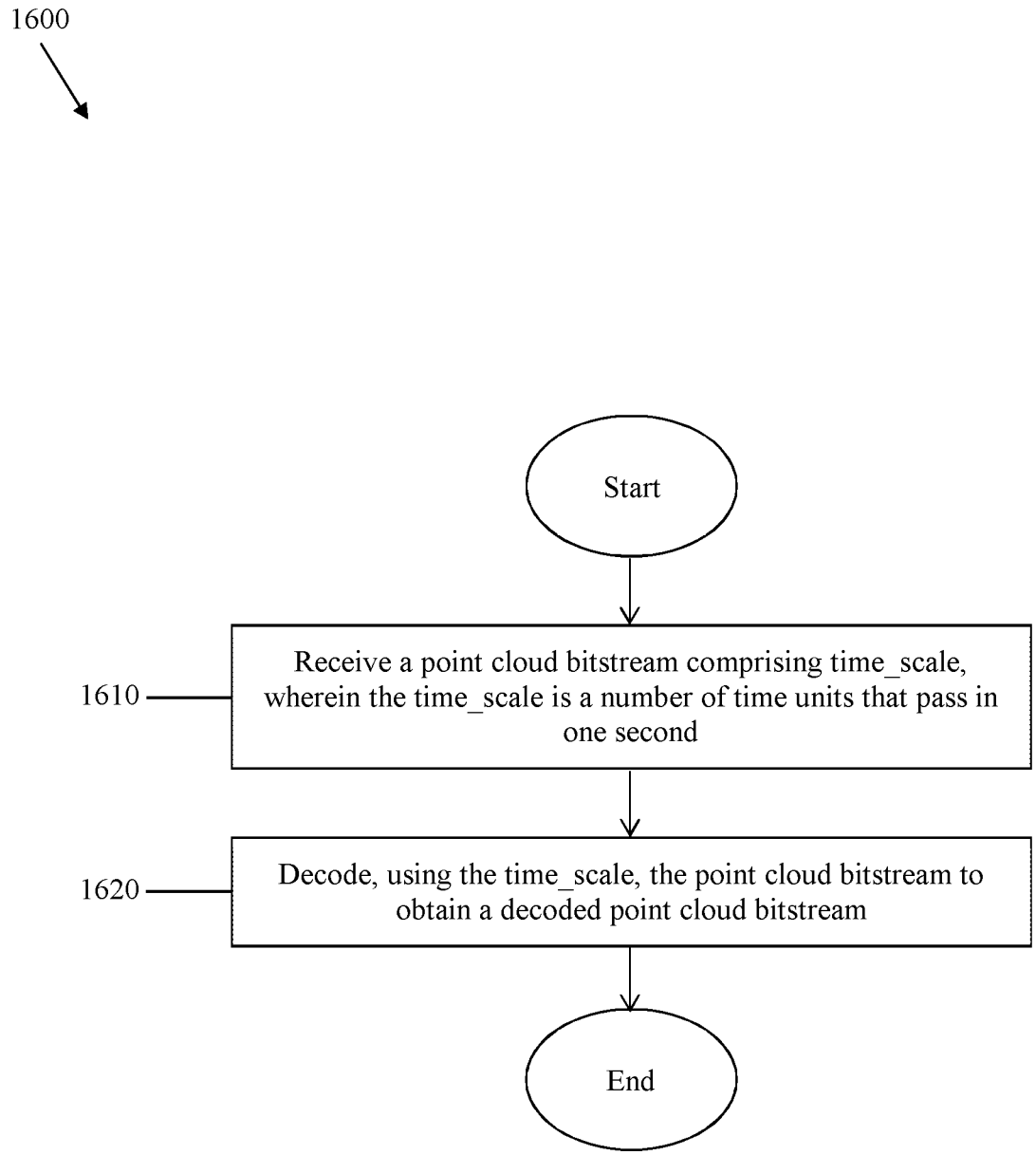
FIG. 16 is a flowchart illustrating a method of decoding a point cloud bitstream according to a third embodiment.

FIG. 16 is a flowchart illustrating a method 1600 of decoding a point cloud bitstream according to a third embodiment. The decoder 400 may implement the method 1600. The decoder 400 may be a PCC decoder. At step 1610, a point cloud bitstream comprising time_scale is received. The time_scale is a number of time units that pass in one second. At step 1620, the point cloud bitstream is decoded using the time_scale to obtain a decoded point cloud bitstream. In an embodiment, a point cloud media (e.g., point cloud media 500) may be obtained from the decoded point cloud bitstream and used to generate or produce an image or video sequence for display to a user on the display or screen of an electronic device (e.g., a smart phone, tablet, laptop, personal computer).

Figure 17:
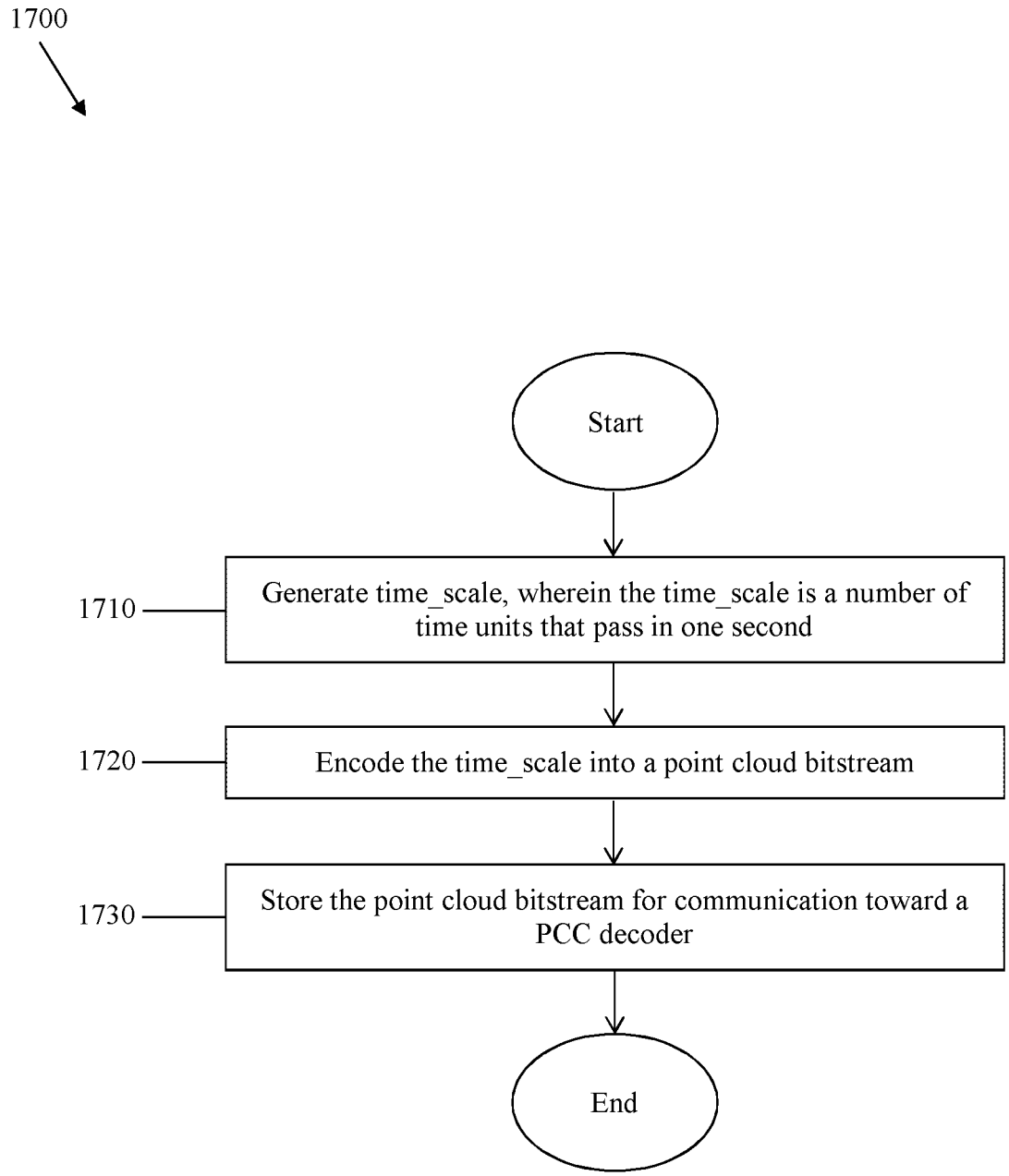
FIG. 17 is a flowchart illustrating a method of encoding a point cloud bitstream according to the third embodiment.

FIG. 17 is a flowchart illustrating a method 1700 of encoding a point cloud bitstream according to the third embodiment. The encoder 300 may implement the method 1700. The encoder 300 may be a PCC encoder. At step 1710, time_scale is generated. The time_scale is a number of time units that pass in one second. At step 1720, the time_scale is encoded into a point cloud bitstream. At step 1730, the point cloud bitstream is stored for communication toward a PCC decoder.

Figure 18:
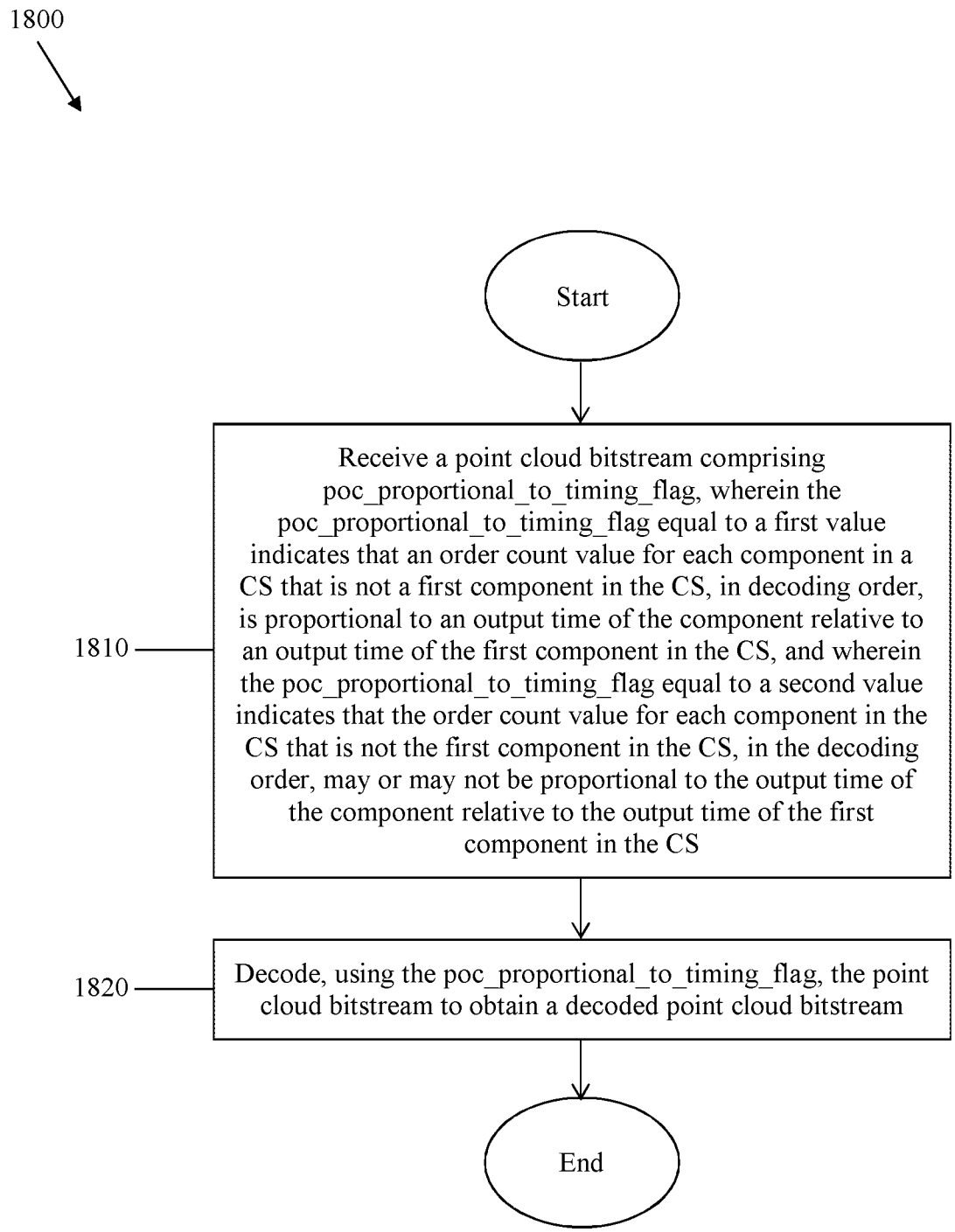
FIG. 18 is a flowchart illustrating a method of decoding a point cloud bitstream according to a fourth embodiment.

FIG. 18 is a flowchart illustrating a method 1800 of decoding a point cloud bitstream according to a fourth embodiment. The decoder 400 may implement the method 1800. The decoder 400 may be a PCC decoder. At step 1810, a point cloud bitstream comprising poc_proportional_to_timing_flag is received. The poc_proportional_to_timing_flag equal to a first value indicates that an order count value for each component in a CS that is not a first component in the CS, in decoding order, is proportional to an output time of the component relative to an output time of the first component in the CS, and wherein the poc_proportional_to_timing_flag equal to a second value indicates that the order count value for each component in the CS that is not the first component in the CS, in the decoding order, may or may not be proportional to the output time of the component relative to the output time of the first component in the CS. At step 1820, the point cloud bitstream is decoded using the poc_proportional_to_timing_flag to obtain a decoded point cloud bitstream. In an embodiment, a point cloud media (e.g., point cloud media 500) may be obtained from the decoded point cloud bitstream and used to generate or produce an image or video sequence for display to a user on the display or screen of an electronic device (e.g., a smart phone, tablet, laptop, personal computer).

The method 1800 may implement additional embodiments. For instance, the first value is 1. The second value is 0.

Figure 19:
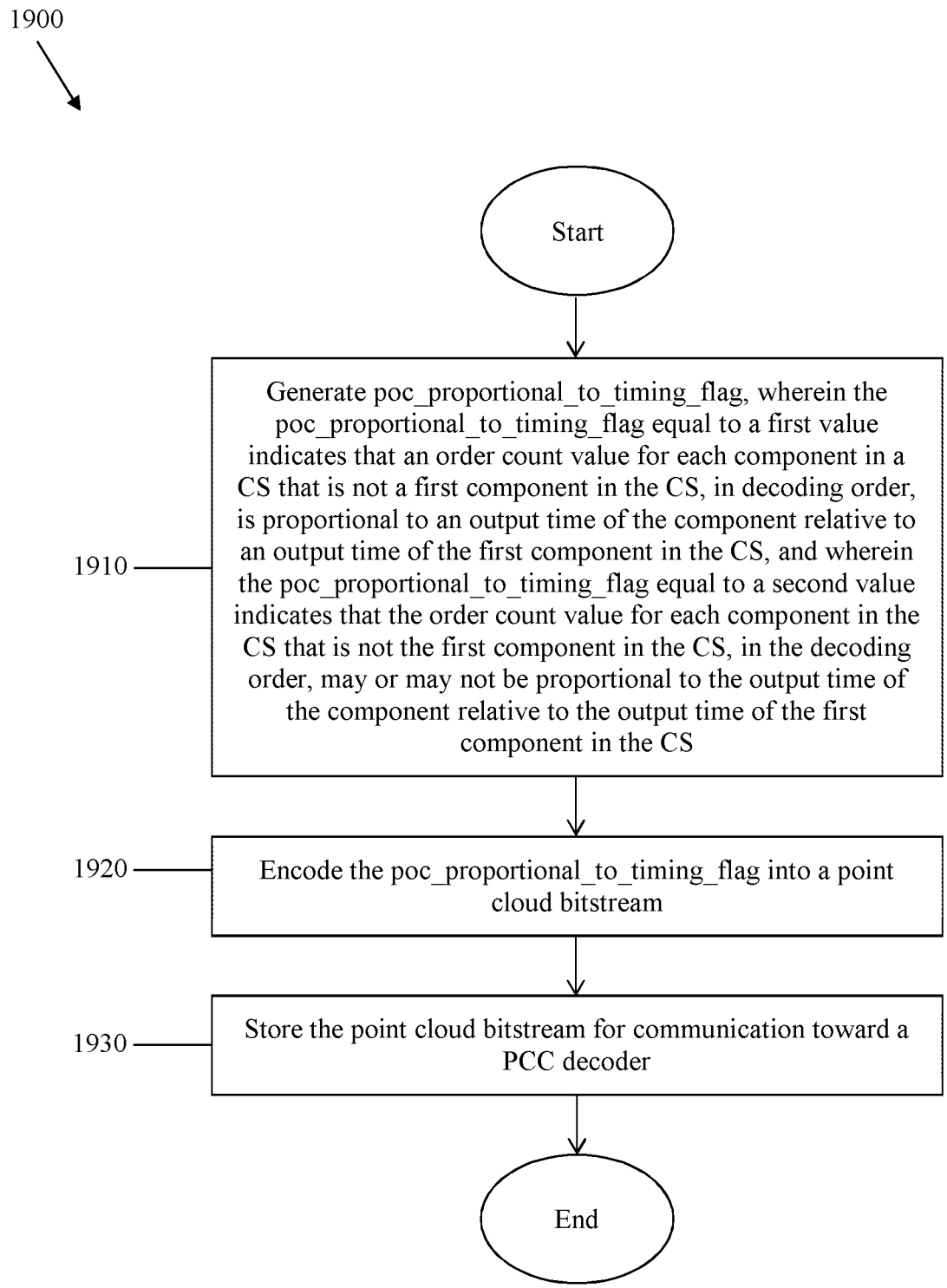
FIG. 19 is a flowchart illustrating a method of encoding a point cloud bitstream according to the fourth embodiment.

FIG. 19 is a flowchart illustrating a method 1900 of encoding a point cloud bitstream according to the fourth embodiment. The encoder 300 may implement the method 1900. The encoder 300 may be a PCC encoder. At step 1910, poc_proportional_to_timing_flag is generated. The poc_proportional_to_timing_flag equal to a first value indicates that an order count value for each component in a CS that is not a first component in the CS, in decoding order, is proportional to an output time of the component relative to an output time of the first component in the CS, and wherein the poc_proportional_to_timing_flag equal to a second value indicates that the order count value for each component in the CS that is not the first component in the CS, in the decoding order, may or may not be proportional to the output time of the component relative to the output time of the first component in the CS. At step 1920, the poc_proportional_to_timing_flag is encoded into a point cloud bitstream. At step 1930, the point cloud bitstream is stored for communication toward a PCC decoder.

Figure 20:
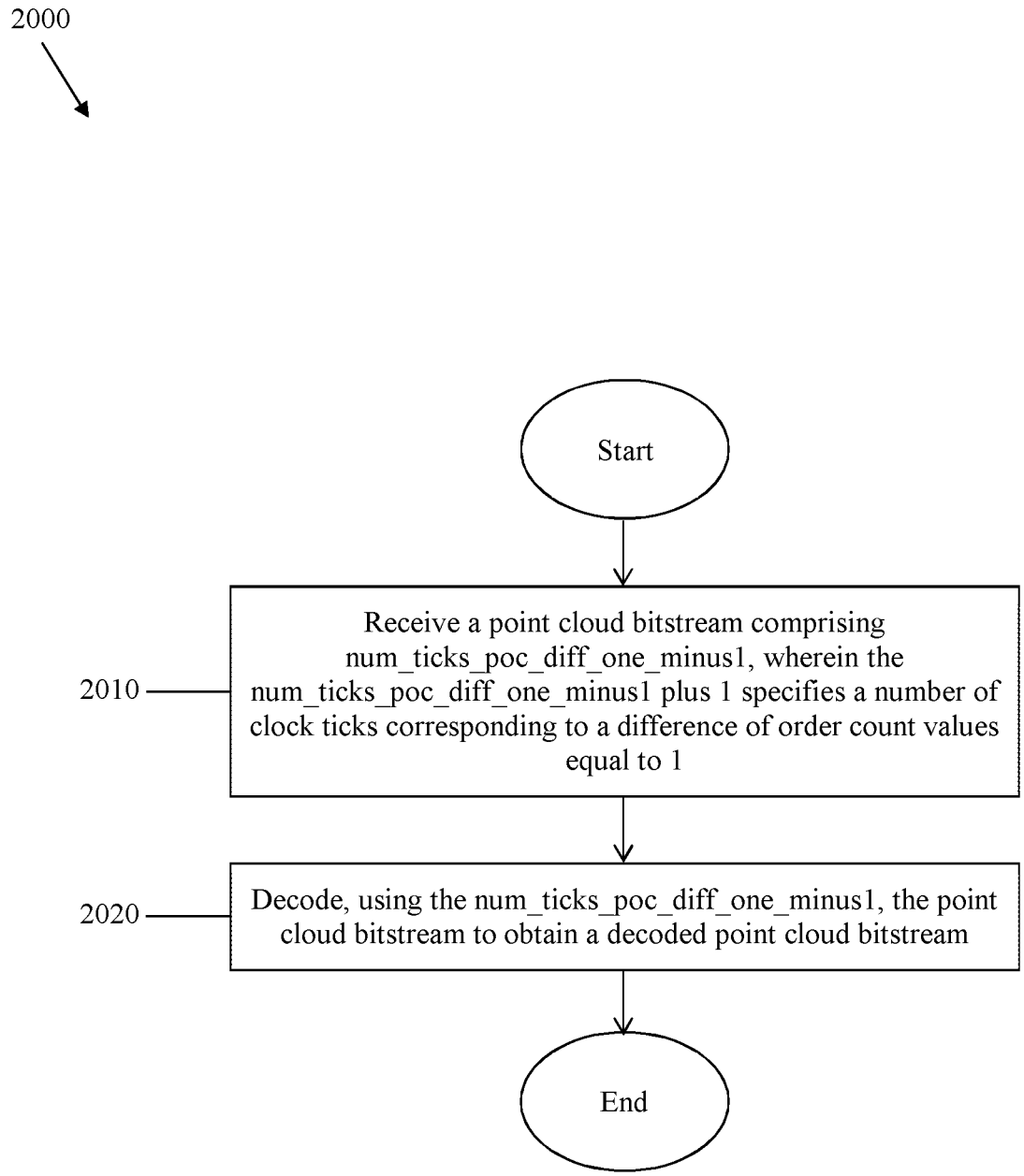
FIG. 20 is a flowchart illustrating a method of decoding a point cloud bitstream according to a fifth embodiment.

FIG. 20 is a flowchart illustrating a method 2000 of decoding a point cloud bitstream according to a fifth embodiment. The decoder 400 may implement the method 2000. The decoder 400 may be a PCC decoder. At step 2010, a point cloud bitstream comprising num_ticks_poc_diff_one_minus1 is received. The num_ticks_poc_diff_one_minus1 plus 1 specifies a number of clock ticks corresponding to a difference of order count values equal to 1. At step 2020, the point cloud bitstream is decoded using the num_ticks_poc_diff_one_minus1 to obtain a decoded point cloud bitstream. In an embodiment, a point cloud media (e.g., point cloud media 500) may be obtained from the decoded point cloud bitstream and used to generate or produce an image or video sequence for display to a user on the display or screen of an electronic device (e.g., a smart phone, tablet, laptop, personal computer).

The method 2000 may implement additional embodiments. For instance, a value of the num_ticks_poc_diff_one_minus1 shall be in the range of 0 to $2^{32}-2$, inclusive.

Figure 21:
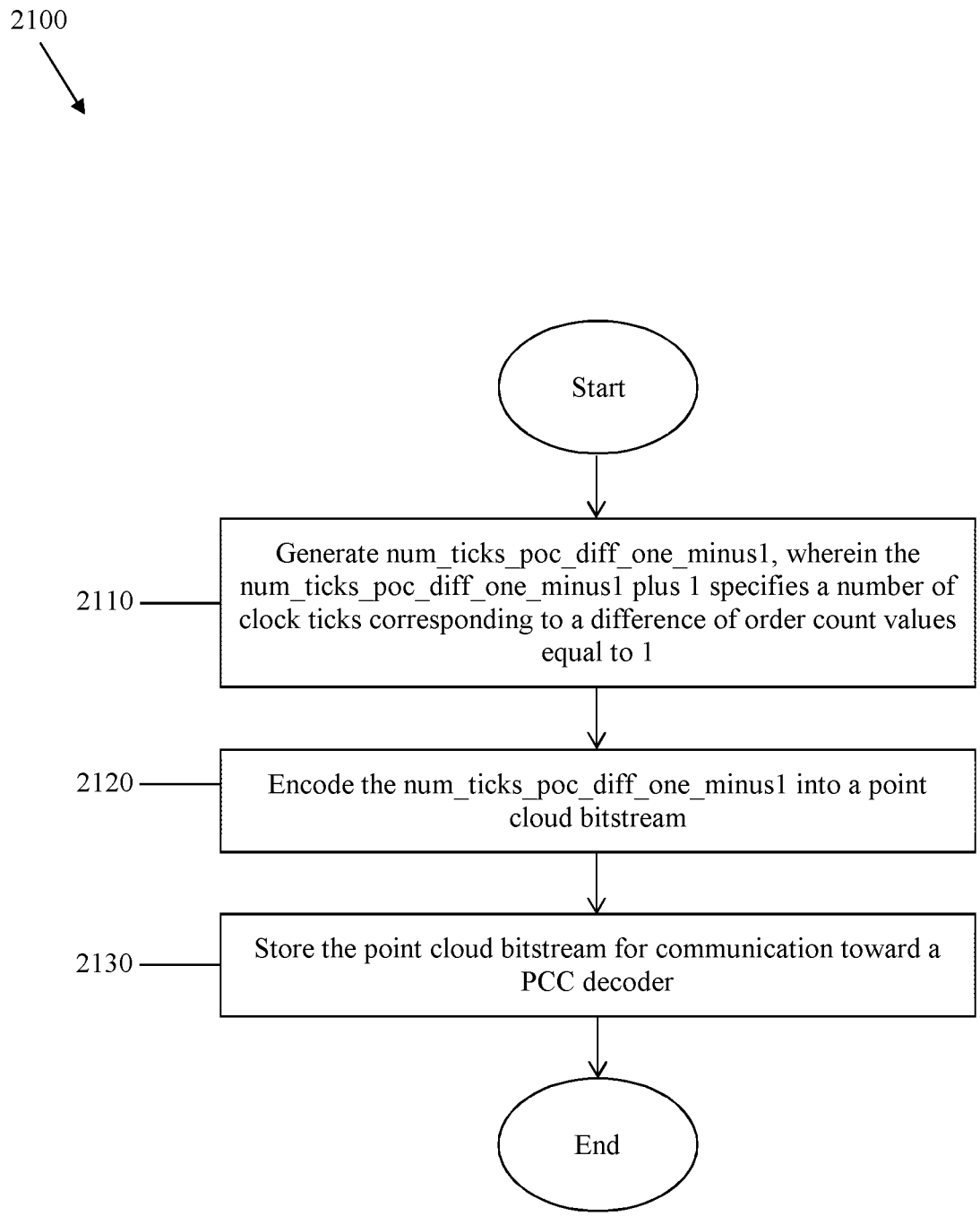
FIG. 21 is a flowchart illustrating a method of encoding a point cloud bitstream according to the fifth embodiment.

FIG. 21 is a flowchart illustrating a method 2100 of encoding a point cloud bitstream according to the fifth embodiment. The encoder 300 may implement the method 2100. The encoder 300 may be a PCC encoder. At step 2110, num_ticks_poc_diff_one_minus1 is generated. The num_ticks_poc_diff_one_minus1 plus 1 specifies a number of clock ticks corresponding to a difference of order count values equal to 1. At step 2120, the num_ticks_poc_diff_one_minus1 is encoded into a point cloud bitstream. At step 2130, the point cloud bitstream is stored for communication toward a PCC decoder.

In an embodiment, a receiving means receives a point cloud bitstream comprising timing_info_present_flag. timing_info_present_flag specifies whether num_units_in_tick, time_scale, and poc_proportional_to_timing_flag are or are not present in a syntax structure. A processing means decodes, using the timing_info_present_flag, the point cloud bitstream to obtain a decoded point cloud bitstream.

The term "about" means a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A decoding method comprising:
receiving a point cloud bitstream comprising a timing_info_present_flag value and an atlas sequence parameter set, wherein the timing_info_present_flag value specifies whether a num_units_in_tick value, a time_scale value, a poc_proportional_to_timing_flag value, and a num_hrd_parameters value are or are not present in a syntax structure in the point cloud bitstream, and wherein the atlas sequence parameter set comprises the timing_info_present_flag value; and
decoding, using the timing_info_present_flag value, the point cloud bitstream to obtain a decoded point cloud bitstream.

2. The method of claim 1, wherein the timing_info_present_flag value equal to 1 specifies that the num_units_in_tick value, the time_scale value, the poc_proportional_to_timing_flag value, and the num_hrd_parameters value are present in the syntax structure.

3. The method of claim 1, wherein the timing_info_present_flag value equal to 0 specifies that the num_units_in_tick value, the time_scale value, the poc_proportional_to_timing_flag value, and the num_hrd_parameters value are not present in the syntax structure.

4. The method of claim 1, further comprising storing the point cloud bitstream.

5. The method of claim 1, further comprising displaying a picture or a video from the decoded point cloud bitstream.

6. The method of claim 1, wherein the atlas sequence parameter set is the syntax structure.

7. An apparatus comprising:
a memory configured to store instructions; and
one or more processors coupled to the memory and configured to execute the instructions to cause the apparatus to:
  receive a point cloud bitstream comprising a timing_info_present_flag value and an atlas sequence parameter set, wherein the timing_info_present_flag value specifies whether a num_units_in_tick value, a time_scale value, a poc_proportional_to_timing_flag value, and a num_hrd_parameters value are or are not present in a syntax structure in the point cloud bitstream, and wherein the atlas sequence parameter set comprises the timing_info_present_flag value; and
  decode, using the timing_info_present_flag value, the point cloud bitstream to obtain a decoded point cloud bitstream.

8. The apparatus of claim 7, wherein the timing_info_present_flag value equal to 1 specifies that the num_units_in_tick value, the time_scale value, the poc_proportional_to_timing_flag value, and the num_hrd_parameters value are present in the syntax structure.

9. The apparatus of claim 7, wherein the timing_info_present_flag value equal to 0 specifies that the num_units_in_tick value, the time_scale value, and the poc_proportional_to_timing_flag value are not present in the syntax structure.

10. The apparatus of claim 7, wherein the one or more processors are further configured to execute the instructions to cause the apparatus to store the point cloud bitstream.

11. The apparatus of claim 7, wherein the one or more processors are further configured to execute the instructions to cause the apparatus to display a picture or a video from the decoded point cloud bitstream.

12. The apparatus of claim 7, wherein the atlas sequence parameter set is the syntax structure.

13. A on-transitory computer-readable medium storing instructions that, when executed by one or more processors, cause an apparatus to:
  receive a point cloud bitstream comprising a timing_info_present_flag value and an atlas sequence parameter set, wherein the timing_info_present_flag value specifies whether a num_units_in_tick value, a time_scale value, a poc_proportional_to_timing_flag value, and a num_hrd_parameters value are or are not present in a syntax structure in the point cloud bitstream, and wherein the atlas sequence parameter set comprises the timing_info_present_flag value; and
  decode, using the timing_info_present_flag value, the point cloud bitstream to obtain a decoded point cloud bitstream.

14. The non-transitory computer-readable medium of claim 13, wherein the timing_info_present_flag value equal to 1 specifies that the num_units_in_tick value, the time_scale value, the poc_proportional_to_timing_flag value, and the num_hrd_parameters value are present in the syntax structure.

15. The non-transitory computer-readable medium of claim 13, wherein the timing_info_present_flag value equal to 0 specifies that the num_units_in_tick value, the time_scale value, and the poc_proportional_to_timing_flag value are not present in the syntax structure.

16. The non-transitory computer-readable medium of claim 13, wherein the instructions, when executed by the one or more processors, further cause the apparatus to store the point cloud bitstream.

17. The non-transitory computer-readable medium of claim 13, wherein the instructions, when executed by the one or more processors, further cause the apparatus to display a picture or a video from the decoded point cloud bitstream.

18. The non-transitory computer-readable medium of claim 13, wherein the atlas sequence parameter set is the syntax structure.

* * * * *

UNITED STATES PATENT AND TRADEMARK OFFICE
CERTIFICATE OF CORRECTION

| | | |
|---|---|---|
| PATENT NO. | : 12,184,898 B2 | Page 1 of 1 |
| APPLICATION NO. | : 17/714608 | |
| DATED | : December 31, 2024 | |
| INVENTOR(S) | : Vladyslav Zakharchenko et al. | |

It is certified that error appears in the above-identified patent and that said Letters Patent is hereby corrected as shown below:

On the Title Page

Item (71) Applicant: Delete "Huawei Technologies Co., Ltd., Guangdong Province (CN)" and insert -- Huawei Technologies Co., Ltd., Shenzhen (CN) --.

Signed and Sealed this
Third Day of June, 2025

Coke Morgan Stewart
*Acting Director of the United States Patent and Trademark Office*